(12) United States Patent
Asakura et al.

(10) Patent No.: US 10,619,523 B2
(45) Date of Patent: Apr. 14, 2020

(54) CAM SHAFT FOR ENGINE AND METHOD FOR MANUFACTURING SAME

(71) Applicant: MAZDA MOTOR CORPORATION, Hiroshima (JP)

(72) Inventors: Youji Asakura, Higashihiroshima (JP); Hideo Tone, Aki-gun (JP); Akira Asai, Hiroshima (JP); Michihiro Kanamura, Hiroshima (JP); Shoichi Furuya, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 73 days.

(21) Appl. No.: 15/761,698

(22) PCT Filed: Mar. 13, 2017

(86) PCT No.: PCT/JP2017/009983
§ 371 (c)(1),
(2) Date: Mar. 20, 2018

(87) PCT Pub. No.: WO2017/169694
PCT Pub. Date: Oct. 5, 2017

(65) Prior Publication Data
US 2018/0347411 A1 Dec. 6, 2018

(30) Foreign Application Priority Data

Mar. 31, 2016 (JP) .................. 2016-071932
Mar. 31, 2016 (JP) .................. 2016-071933

(51) Int. Cl.
*F01L 1/04* (2006.01)
*F01L 1/047* (2006.01)
(Continued)

(52) U.S. Cl.
CPC ............... *F01L 1/047* (2013.01); *B22C 7/00* (2013.01); *B22C 9/02* (2013.01); *B22C 9/22* (2013.01);
(Continued)

(58) Field of Classification Search
CPC .... F01L 1/047; F01L 1/04; B22C 9/22; F16C 2220/02
(Continued)

(56) References Cited

U.S. PATENT DOCUMENTS 4,886,022 A * 12/1989 Nakai ............... F01L 13/00
123/90.17
6,035,821 A 3/2000 Takahashi et al.
2008/0070708 A1 3/2008 Brinkmann et al.

FOREIGN PATENT DOCUMENTS

JP S51-058206 U 5/1976
JP S62-199907 A 9/1987
(Continued)

OTHER PUBLICATIONS

International Search Report issued in PCT/JP2017/009983; dated Apr. 4, 2017.
(Continued)

*Primary Examiner* — Ching Chang
(74) *Attorney, Agent, or Firm* — Studebaker & Brackett PC

(57) ABSTRACT

This exhaust cam shaft (2) is provided with a shaft part (5) and cam parts (6 to 13) provided on the outer circumference of the shaft part (5). The shaft part (5) has holes (16, 17, 19) opened at predetermined positions on the outer circumferential surface of the shaft part (5). The holes (16, 17, 19) are formed so as to be gradually tapered from an outside of the shaft part (5) toward a center of the shaft part (5) in a radial direction.

3 Claims, 23 Drawing Sheets

(51) Int. Cl.
 *B22C 7/00* (2006.01)
 *B22C 9/02* (2006.01)
 *B22C 9/22* (2006.01)
 *F16C 3/18* (2006.01)
 *B22D 25/02* (2006.01)
 *F16H 53/02* (2006.01)

(52) U.S. Cl.
 CPC ............... *B22D 25/02* (2013.01); *F01L 1/04* (2013.01); *F16C 3/18* (2013.01); *F16H 53/025* (2013.01); *F01L 2103/00* (2013.01); *F16C 2220/02* (2013.01); *F16C 2360/18* (2013.01)

(58) Field of Classification Search
 USPC ................................ 123/90.16, 90.44, 90.6
 See application file for complete search history.

(56) References Cited

FOREIGN PATENT DOCUMENTS

| | | |
|---|---|---|
| JP | H04-325704 A | 11/1992 |
| JP | H10-15658 A | 1/1998 |
| JP | H11-022422 A | 1/1999 |
| JP | 2008-75653 A | 4/2008 |
| JP | 2010-149135 A | 7/2010 |
| JP | 2011-032897 A | 2/2011 |
| JP | 2014-018833 A | 2/2014 |

OTHER PUBLICATIONS

An Office Action; "Notice of Reasons for Refusal," issued by the Japanese Patent Office dated Mar. 20, 2018, which corresponds to Japanese Patent Application No. 2016-071933 and is related to U.S. Appl. No. 15/761,698; with English Translation.

* cited by examiner

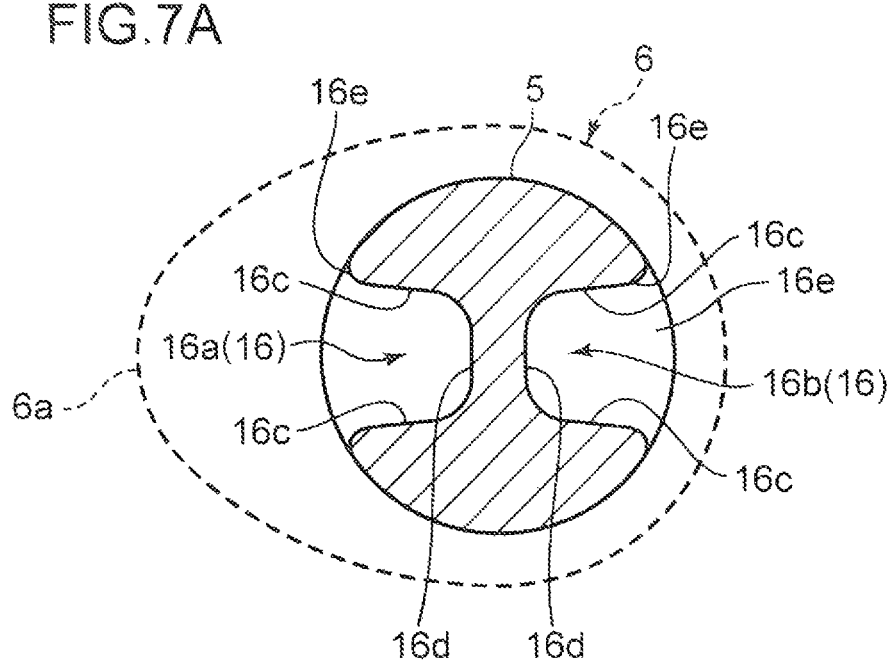

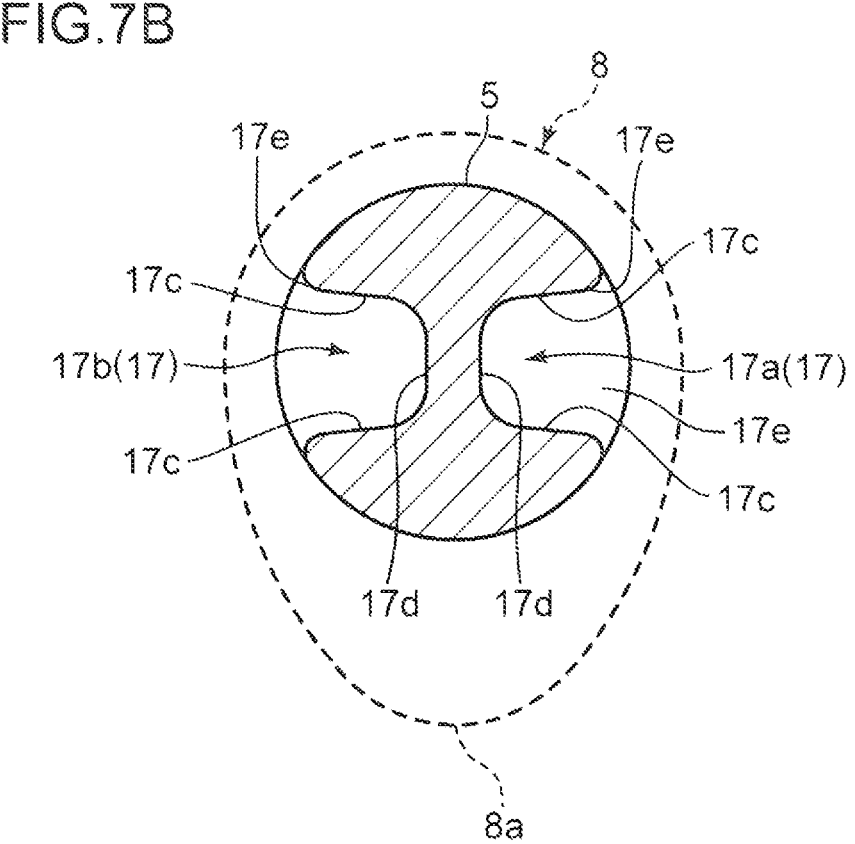

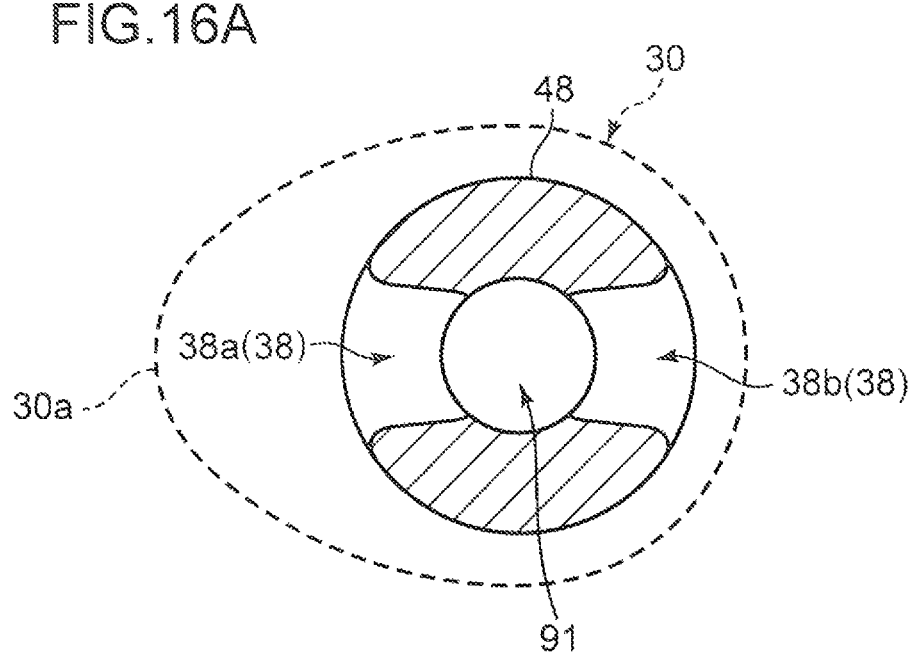

CAM SHAFT FOR ENGINE AND METHOD FOR MANUFACTURING SAME

TECHNICAL FIELD

The present invention relates to a cam shaft for an engine and a method for manufacturing the cam shaft.

BACKGROUND ART

Cam shafts for engines to date encompass a cam shaft including a shaft part that is solid (solid type) and a cam shaft including a shaft part that is hollow in an entire length direction of the shaft part (hollow type). Patent Literature 1 discloses one example of a method for manufacturing a cam shaft of the hollow type.

The method for manufacturing the cam shaft described in Patent Literature 1 includes the steps of: manufacturing a casting mold by placing, in a main mold that is made of sand and/or the like and is collapsible, a core that is made of sand and/or the like and is collapsible; pouring a molten metal into a cavity formed between the main mold and the core; and causing the casting mold to collapse and removing the casting mold after the molten metal is cooled. In addition, the core is provided with a plurality of positioning pins protruding from an outer circumferential surface of the core in a radial direction. The plurality of pins define the position of the core in the main mold.

According to the method for manufacturing the cam shaft described in Patent Literature 1, it is possible to manufacture a cam shaft having a lighter weight than a cam shaft of the solid type. However, the method of Patent Literature 1 may cause the following problems.

That is, according to this method, it is necessary to prepare a core for hollowing a shaft part of a cam shaft and to position the core in a main mold. Furthermore, in order to accurately define the position of the core in the main mold, the core needs to be provided with pins as those described above such that the pins are projected from the core. Consequently, there arise a problem that the number of casting mold parts increases and accordingly the manufacturing cost of the casting mold increases. Moreover, by shot blasting or the like, it is necessary to cause the core to collapse and to remove the core via a shaft hole of the cam shaft having been removed from the main mold. Consequently, there arises a problem that the number of steps for manufacturing the cam shaft is significantly increased as compared with the cam shaft of the solid type.

CITATION LIST

Patent Literature

Patent Literature 1: JP 2014-18833 A

SUMMARY OF INVENTION

An object of the present invention is to provide a cam shaft for an engine and a method for manufacturing the cam shaft, the cam shaft being lightweight and being easy to manufacture.

The present invention is a cam shaft for an engine, the cam shaft being made by casting, the cam shaft including: a shaft part; and a cam part disposed on an outer circumference of the shaft part, wherein the shaft part has a hole that is opened at a predetermined position in an outer circumferential surface of the shaft part, and the hole is gradually tapered from an outside of the shaft part toward a center of the shaft part in a radial direction.

The present invention is a method for manufacturing the above-described cam shaft for the engine, the method including the steps of: preparing a pattern of the cam shaft, the pattern including a first pattern element corresponding to a one-side portion of the cam shaft in a radial direction and a second pattern element corresponding to an another-side portion of the cam shaft in the radial direction; manufacturing a first sand mold by placing the first pattern element in a casting flask, charging casting sand into the casting flask, hardening the casting sand, and taking the first pattern element out of the casting sand having been hardened; manufacturing a second sand mold by placing the second pattern element in a casting flask, charging casting sand into the casting flask, hardening the casting sand, and taking the second pattern element out of the casting sand having been hardened; manufacturing a casting mold by combining the first sand mold and the second sand mold to each other, the casting mold having a cavity in which the cam shaft is to be casted; pouring a molten metal into the cavity and cooling down the molten metal to harden the molten metal; and taking the cam shaft out of the casting mold by causing the casting mold to collapse and removing the casting mold.

BRIEF DESCRIPTION OF DRAWINGS

FIG. 7A is a cross-sectional view of the exhaust cam shaft (a cross-sectional view taken along line C-C of FIG. 3).

FIG. 7B is a cross-sectional view of the exhaust cam shaft (a cross-sectional view taken along line D-D of FIG. 3).

FIG. 16A is a cross-sectional view of the intake cam shaft illustrated in FIG. 15, taken along line E-E of FIG. 15.

DESCRIPTION OF EMBODIMENTS

With reference to the drawings attached herewith, preferred embodiments of the present invention will be described in detail below.

<Structure of Engine Including Cam Shaft>

Figure 1:
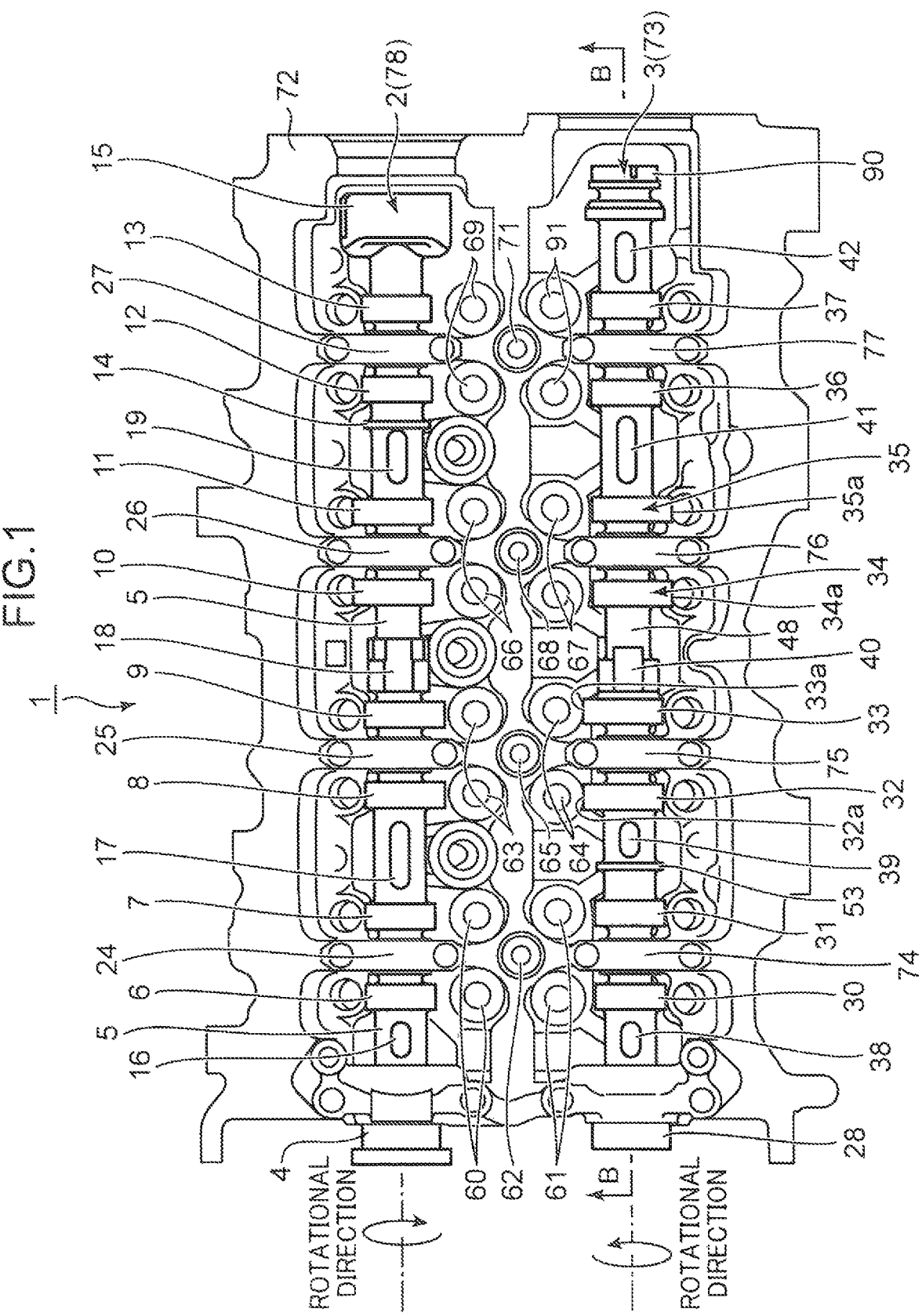
FIG. 1 is a plan view of a cylinder head including cam shafts (an exhaust cam shaft and an intake cam shaft) for an engine, according to an embodiment of the present invention.

An engine including a cam shaft according to an embodiment of the present invention is a 4-cycle diesel engine with inline four cylinders. As illustrated in FIG. 1, this engine includes a cylinder block (not shown) and a cylinder head 72 mounted on the cylinder block. In the engine illustrated in FIG. 1, four cylinders, i.e., a first cylinder, a second cylinder, a third cylinder, and a fourth cylinder are arranged in this order from the left, although they are not shown in the drawings.

The cylinder head 72 includes, for each cylinder, two exhaust ports and two intake ports communicated with a combustion chamber, exhaust valves for shutting off the exhaust ports from the combustion chamber, and intake valves for shutting off the intake ports from the combustion chamber (these elements are not shown). In addition, the cylinder head 72 includes an exhaust valve drive mechanism 78 for driving the exhaust valves to open and close the exhaust ports at predetermined timings, an intake valve drive mechanism 73 for driving the intake valves to open and close the intake ports at predetermined timings, four bearing parts 24 to 27 rotatably supporting an exhaust cam shaft 2 (described later), and four bearing parts 74 to 77 rotatably supporting an intake cam shaft 3 (described later).

The exhaust valve drive mechanism 78 includes the exhaust cam shaft 2, and the intake valve drive mechanism 73 includes the intake cam shaft 3. The exhaust cam shaft 2 and the intake cam shaft 3 are each coupled to a crankshaft via a well-known power transmission mechanism made of, e.g., a chain and a sprocket. In addition, the exhaust valve drive mechanism 78 includes a return spring (not shown) for biasing the exhaust valves in a closing direction, and the intake valve drive mechanism 73 includes a return spring (not shown) for biasing the intake valves in a closing direction. Against the biasing forces given by the return springs, the exhaust cam shaft 2 and the intake cam shaft 3 respectively open the exhaust valves and the intake valves by a driving force given by the crankshaft. The exhaust cam shaft 2 and the intake cam shaft 3 correspond to a "cam shaft for an engine" of the present invention.

<Structure of Exhaust Cam Shaft>

Figure 2:
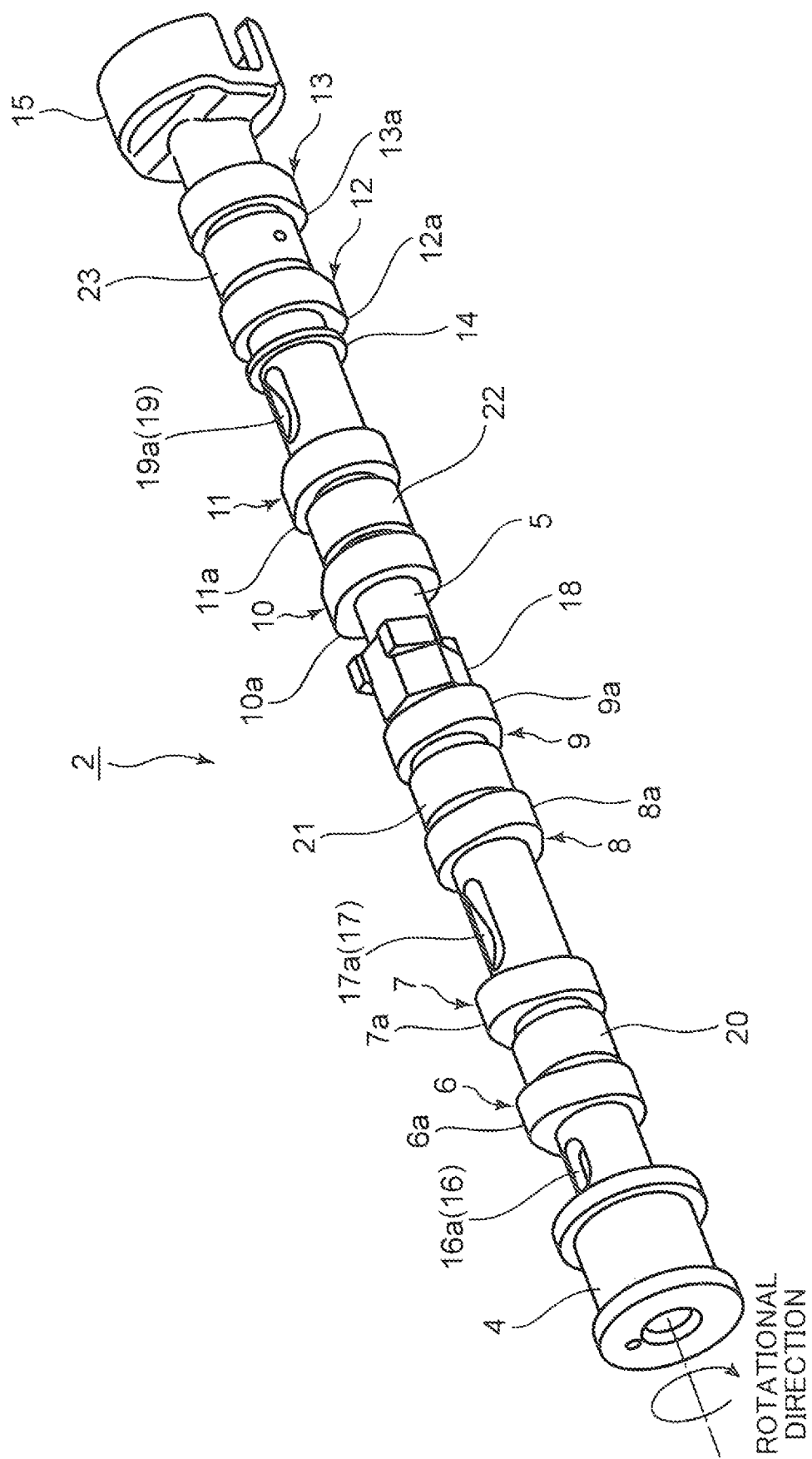
FIG. 2 is a perspective view of the exhaust cam shaft illustrated in FIG. 1.
Figure 3:
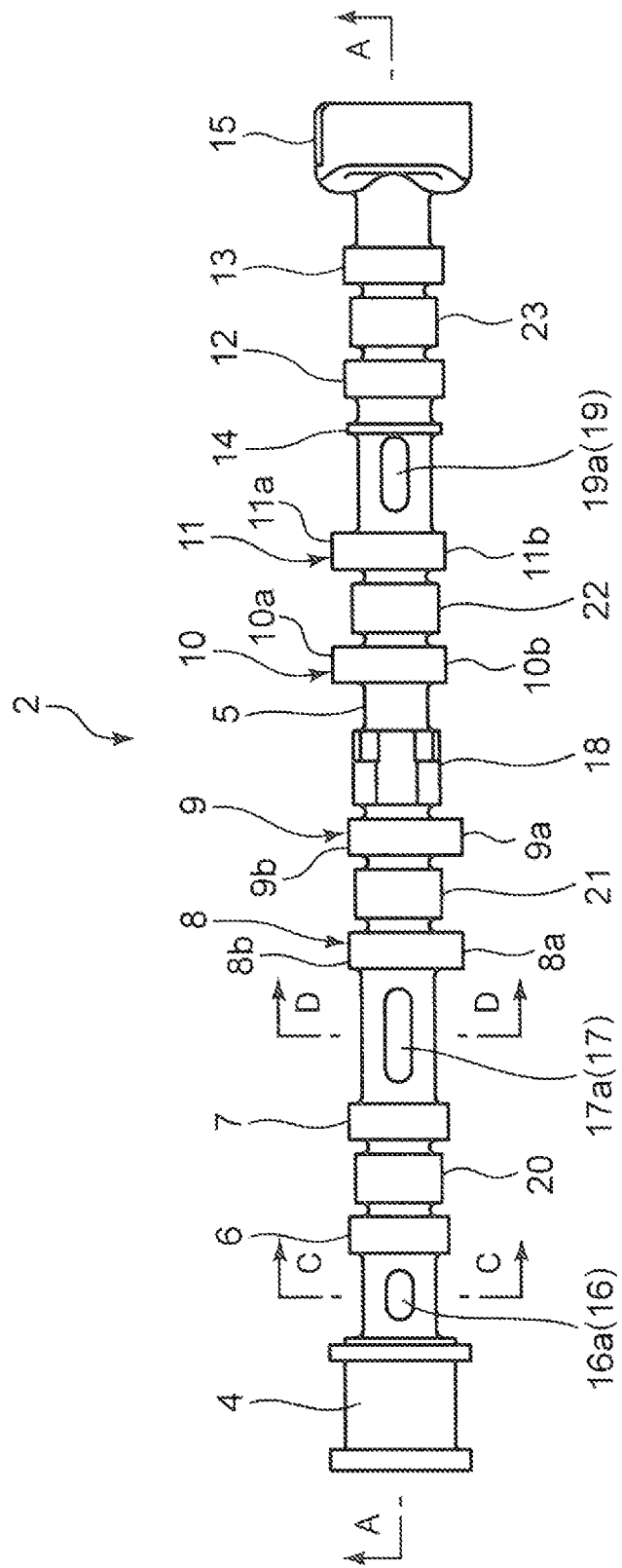
FIG. 3 is a plan view of the exhaust cam shaft.

As illustrated in FIGS. 1 to 3, the exhaust cam shaft 2 includes a shaft part 5 extending in a cylinder bank direction and having a columnar shape, eight cam parts (a first cam part 6, a second cam part 7, a third cam part 8, a fourth cam part 9, a fifth cam part 10, a sixth cam part 11, a seventh cam part 12, and an eighth cam part 13 arranged in this order from the left in FIG. 1) provided integrally to an outer circumference of the shaft part 5, journal parts 20 to 23 (see FIG. 2) provided integrally to the outer circumference of the shaft part 5 and rotatably supported by the respective bearing parts 24 to 27, a sprocket mount part 4 provided integrally to one end of the shaft part 5 and provided with a sprocket (not shown) around which a timing chain is wound, and an Oldham's coupling part 15 provided integrally to the other end of the shaft part 5 and coupled to a drive shaft (not shown) of a fuel pump. In the example illustrated in FIG. 1, the exhaust cam shaft 2 rotates clockwise (around to the right) when viewed from the left side.

Figure 4:
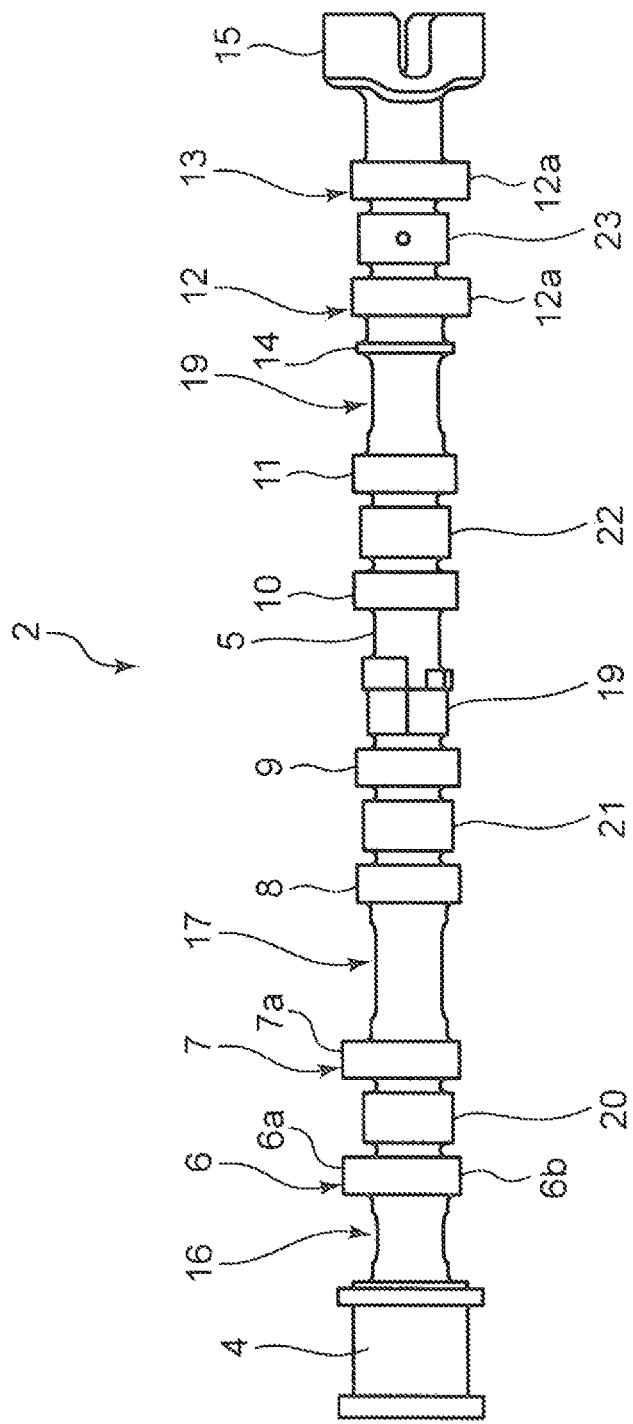
FIG. 4 is a side view of the exhaust cam shaft.

In the exhaust cam shaft 2, the first cam part 6 and the second cam part 7 are eccentric cams provided for the first cylinder, and are adjacent to each other via the journal part 20 (see FIGS. 2 to 4). The first cam part 6, the second cam part 7, and the journal part 20 are located above the first cylinder and on the exhaust side. Similarly, the third cam part 8 and the fourth cam part 9 are eccentric cams provided for the second cylinder, and are adjacent to each other via the journal part 21. The third cam part 8, the fourth cam part 9, and the journal part 21 are located above the second cylinder and on the exhaust side. The fifth cam part 10 and the sixth cam part 11 are eccentric cams provided for the third cylinder, and are adjacent to each other via the journal part 22. The fifth cam part 10, the sixth cam part 11, and the journal part 22 are located above the third cylinder and on the exhaust side. The seventh cam part 12 and the eighth cam part 13 are eccentric cams provided for the fourth cylinder, and are adjacent to each other via the journal part 23. The seventh cam part 12, the eighth cam part 13, and the journal part 23 are located above the fourth cylinder and on the exhaust side. The cam parts 6 to 13 are respectively provided with nose parts 6a to 13a (see FIG. 2) in a one-by-one relationship, the nose parts 6a to 13a protruding from their respective base circles outwardly in a radial direction.

In the engine according to the present embodiment, a firing order of the cylinders is as follows: the first cylinder, the third cylinder, the fourth cylinder, and the second cylinder. Accordingly, the cam parts 6 to 13 of the exhaust cam shaft 2 are disposed to have phase differences between the cam parts so that the exhaust valves are opened in the above firing order at every 90° rotation of the exhaust cam shaft 2 (see FIG. 2).

The shaft part 5 of the exhaust cam shaft 2 includes a hole 16 located in a section between the sprocket mount part 4 and the first cam part 6 (this section corresponds to a "first section" of the present invention; this section may sometimes be referred to as the "first section" in the following description), a hole 17 located in a section between the second cam part 7 and the third cam part 8 (this section corresponds to a "second section" of the present invention; this section may sometimes be referred to as the "second section" in the following description), a rotational angle adjusting part 18 located between the fourth cam part 9 and the fifth cam part 10, and a hole 19 and a cam shaft identification ring 14 located in a section between the sixth cam part 11 and the seventh cam part 12 (this section corresponds to the "second section" of the present invention; this section may sometimes be referred to as the "second section" in the following description).

Figure 5:
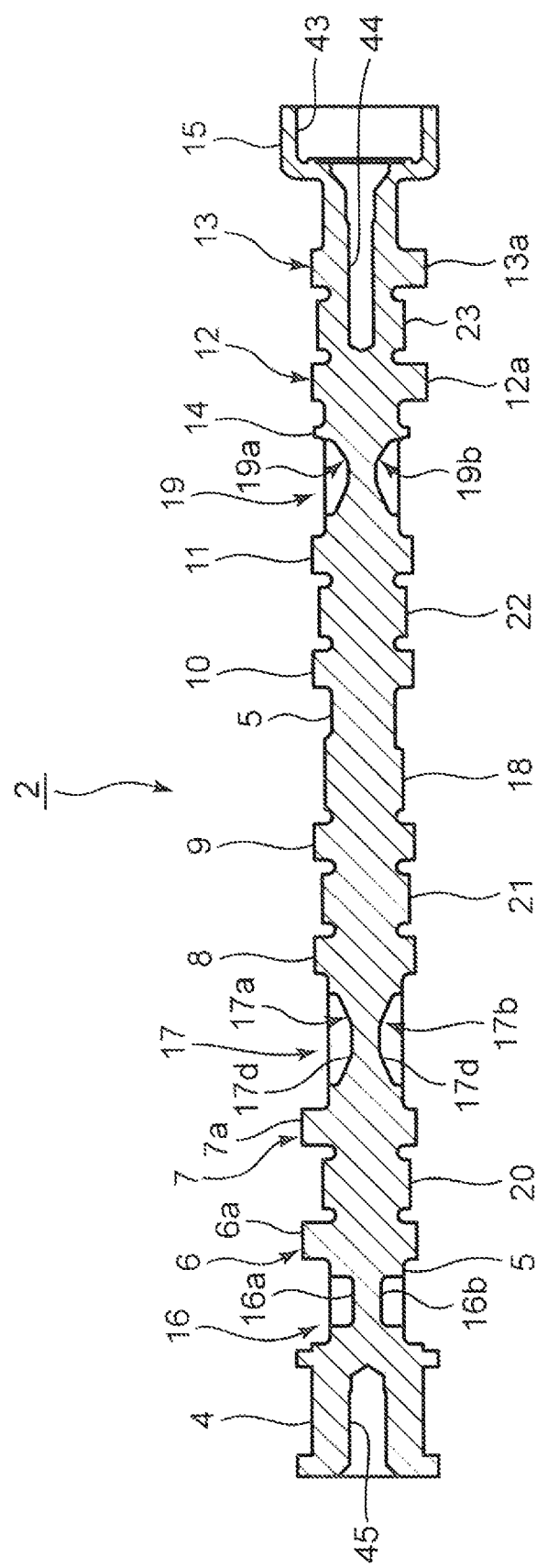
FIG. 5 is a cross-sectional view of the exhaust cam shaft (a cross-sectional view taken along line A-A of FIG. 3).

As illustrated in FIGS. 5 and 7A, the hole 16 includes a first hole 16a that is opened at a predetermined position on one side of the shaft part 5 in a radial direction and a second hole 16b that is opened at a predetermined position on another side of the shaft part 5 in the radial direction. Each of the first hole 16a and the second hole 16b extends in a length direction of the shaft part 5, and is gradually tapered from an outside of the shaft part 5 toward a center of the shaft part 5 in the radial direction. More specifically, each of the holes 16a and 16b has an opening part 16e, a bottom part 16d, and a surrounding wall part 16c. The opening part 16e is opened, on the outer circumferential surface of the shaft part 5, in the shape of a rectangle extending in the length direction of the shaft part 5 and having two opposed ends shaped in half circles. The bottom part 16d has substantially the same shape as the shape of the opening part 16e, has a smaller area than an opening area of the opening part 16e, and is substantially flat. The surrounding wall part 16c connects the opening part 16e and the bottom part 16d. The bottom part 16d has a substantially constant depth in an entire length direction of the bottom part 16d. The boundary between the surrounding wall part 16c and the bottom part 16d has a curved surface.

The first hole 16a is provided at a position at which the first hole 16a is symmetric to the second hole 16b with respect to a center line of the shaft part 5, and has the same size and the same shape as a size and a shape of the second hole 16b. The first hole 16a is formed on a side close to an apex of the nose part 6a of the first cam part 6, specifically, at a position at which a phase (rotational phase) of the first hole 16a coincides with the apex. The second hole 16b is formed on a side opposite to the nose part 6a of the first cam part 6, specifically, at a position at which a phase of the second hole 16b differs from the apex of the nose part 6a by approximately 180°. The first hole 16a and the second hole 16b correspond to a "first thickness-reduced part" of the present invention. In the following description, these holes 16a and 16b may sometimes be referred to as a "first thickness-reduced part".

As illustrated in FIGS. 5 and 7B, the hole 17 includes a first hole 17a that is opened at a predetermined position on one side of the shaft part 5 in the radial direction and a second hole 17b that is opened at a predetermined position on another side of the shaft part 5 in the radial direction. Each of the first hole 17a and the second hole 17b extends in the length direction of the shaft part 5, and is gradually tapered from the outside of the shaft part 5 toward the center of the shaft part 5 in the radial direction.

More specifically, each of the first hole 17a and the second hole 17b has an opening part 17e, a slope 17d, and a side wall part 17c. The opening part 17e is opened, on the outer circumferential surface of the shaft part 5, in the shape of a rectangle extending in the length direction of the shaft part 5 and having two opposed ends shaped in half circles. The slope 17d, which has a cross section of a substantially V-shape, extends in the length direction of the shaft part 5, has a smaller width than a width of the opening part 17e, and has a depth that gradually increases from two opposed ends of the slope 17d in the length direction toward a center of the slope 17d (i.e., that gets closer to the center in the radial direction), in other words, a depth that gradually decreases from the center in the length direction of the shaft part 5 toward the two opposed ends in the length direction, and the two opposed ends in the length direction are connected with the opening part 17e. The side wall part 17c rises from two opposed ends of the slope 17d in a width direction and are connected to ends of the opening part 17e in the width direction. A bottom part (a lower end of the V-shape) of the slope 17d has a curved surface, and a depth at the bottom part (a depth at a deepest point of each of the first hole 17a and the second hole 17b) is set to be substantially the same as the depths of the first hole 16a and the second hole 16b. That is, a diameter of a portion of the shaft part 5, which portion corresponds to the section between the second cam part 7 and the third cam part 8, is set to be greater than a diameter of a portion of the shaft part 5, which portion corresponds to the section between the sprocket mount part 4 and the first cam part 6. Furthermore, in each of the first hole 17a and the second hole 17b, a bottom part of the slope 17d has a curved surface. Accordingly, stress concentration hardly occurs on the bottom parts. Consequently, a strength of the portion of the shaft part 5, which portion corresponds to the section between the second cam part 7 and the third cam part 8, is greater than a strength of the portion of the shaft part 5, which portion corresponds to the section between the sprocket mount part 4 and the first cam part 6.

The first hole 17a is formed at a position at which the first hole 17a is symmetric to the second hole 17b with respect to the center line of the shaft part 5, and has the same size and the same shape as a size and a shape of the second hole 17b. The first hole 17a is formed at a position at which a phase of the first hole 17a is delayed from an apex of the nose part 8a of the third cam part 8 by approximately 90°, and the second hole 17b is formed at a position at which a phase of the second hole 17b is advanced from the apex of the nose part 8a of the third cam part 8 by approximately 90°. The first hole 17a and the second hole 17b correspond to a "second thickness-reduced part" of the present invention. In the following description, these holes 17a and 17b may sometimes be referred to as a "second thickness-reduced part".

The rotational angle adjusting part 18 is a portion that protrudes from the outer circumference of the shaft part 5 outwardly in the radial direction and that has a hexagonal (regular hexagonal) cross section. When the rotational angle adjusting part 18 is used for engine inspection or the like, the rotational angle adjusting part 18 is engaged with a spanner. That is, for the engine inspection or the like, a tip opening part of the spanner may be engaged with the rotational angle adjusting part 18, and the spanner may be rotated. This rotates the shaft part 5, thereby closing the exhaust ports by the exhaust valves. In this manner, it is possible to prevent intrusion of foreign matters such as dust from the exhaust ports during the engine inspection or the like.

As illustrated in FIG. 5, the hole 19 includes a first hole 19a that is opened at a predetermined position on one side of the shaft part 5 in the radial direction and a second hole 19b that is opened at a predetermined position on another side of the shaft part 5 in the radial direction. Each of the first hole 19a and the second hole 19b is tapered from the outside of the shaft part 5 toward the center of the shaft part 5 in the radial direction. More specifically, each of the first hole 19a and the second hole 19b has a cross section of a substantially V-shape, as well as the holes 17a and 17b. However, in order to avoid interference with the cam shaft identification ring 14, each of the first hole 19a and the second hole 19b is shorter than the holes 17a and 17b in the length direction of the shaft part 5. The first hole 19a is formed at a position at which a phase of the first hole 19a is advanced from an apex of the nose part 11a (see FIG. 2) of the sixth cam part 11 by approximately 90°, and the second hole 19b is formed at a position at which a phase of the second hole 19b is delayed from the apex of the nose part 11a of the sixth cam part 11 by approximately 90°.

As well as in the section between the second cam part 7 and the third cam part 8, a diameter of a portion of the shaft part 5, which portion corresponds to the section between the sixth cam part 11 and the seventh cam part 12, is set to be greater than a diameter of a portion of the shaft part 5, which portion corresponds to the section between the sprocket mount part 4 and the first cam part 6. Furthermore, in each of the first hole 19a and the second hole 19b, a bottom part of a slope has a curved surface. Accordingly, stress concentration hardly occurs on the bottom parts. Consequently, a strength of the portion of the shaft part 5, which portion corresponds to the section between the sixth cam part 11 and the seventh cam part 12, is greater than the strength of the portion of the shaft part 5, which portion corresponds to the section between the sprocket mount part 4 and the first cam part 6. The first hole 19a and the second hole 19b correspond to a "second thickness-reduced part" of the present invention. In the following description, these holes 19a and 19b may sometimes be referred to as a "second thickness-reduced part".

The cam shaft identification ring 14 is a portion protruding from the outer circumference of the shaft part 5 outwardly in the radial direction and that has a ring shape. The disposed position of the cam shaft identification ring 14 in the length direction of the shaft part 5 varies depending on the vehicle model. During assembling of the engine, the position of the cam shaft identification ring 14 may be read by a cam shaft identification sensor. Thus, information such as the vehicle model corresponding to the exhaust cam shaft 2 can be identified by an engine assembling apparatus.

As illustrated in FIG. 5, the sprocket mount part 4 has a hole 45 in a center part of the sprocket mount part 4 in the radial direction, the hole 45 extending in its axial direction (length direction). The Oldham's coupling part 15 has a hole 43 penetrating through an inside of the Oldham's coupling part 15 in the axial direction (length direction). In addition, there is provided a hole 44 extending in the length direction from an end of the shaft part 5, which end is on a side of the Oldham's coupling part 15, to a portion of the shaft part 5, which portion corresponds to the journal part 23, the hole 44 being communicated with the hole 43.

<Structure of Intake Cam Shaft>

As illustrated in FIGS. 1 and 4, the intake cam shaft 3 includes a shaft part 48 extending in a cylinder bank direction and having a columnar shape, eight cam parts (a first cam part 30, a second cam part 31, a third cam part 32, a fourth cam part 33, a fifth cam part 34, a sixth cam part 35, a seventh cam part 36, and an eighth cam part 37 arranged in this order from the left in FIG. 1) provided integrally to an outer circumference of the shaft part 48, journal parts 49 to 52 (see FIG. 6) provided integrally to the outer circumference of the shaft part 48 and rotatably supported by the respective bearing parts 74 to 77, a sprocket mount part 28 provided integrally to one end of the shaft part 48 and provided with a sprocket (not shown) around which a timing chain is wound, and an Oldham's coupling part 90 provided integrally to the other end of the shaft part 48 and coupled to a drive shaft (not shown) of a fuel pump. In the example illustrated in FIG. 1, the intake cam shaft 3 rotates counterclockwise (around to the left) when viewed from the left side.

Figure 6:
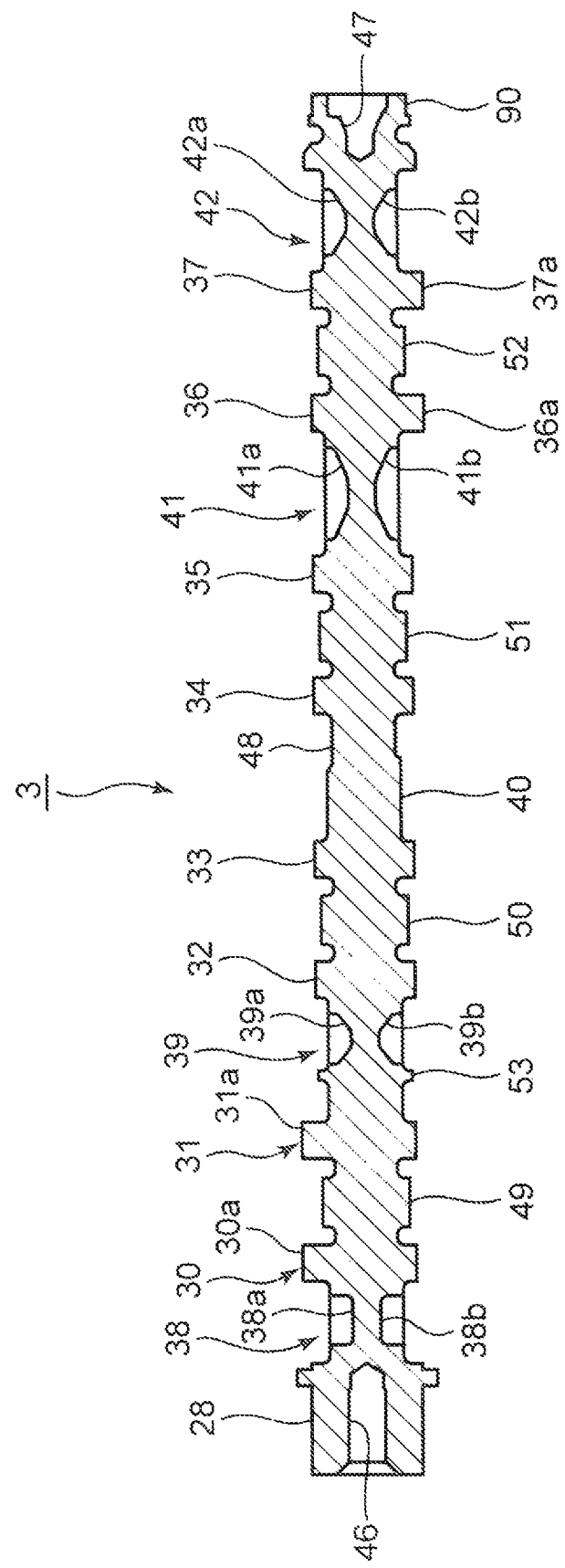
FIG. 6 is a cross-sectional view of the intake cam shaft illustrated in FIG. 1, taken along line B-B of FIG. 1.

In the intake cam shaft 3, the first cam part 30 and the second cam part 31 are eccentric cams provided for the first cylinder, and are adjacent to each other via the journal part 49 (see FIG. 6). The first cam part 30, the second cam part 31, and the journal part 49 are located above the first cylinder and in the intake side. The third cam part 32 and the fourth cam part 33 are eccentric cams provided for the second cylinder, and are adjacent to each other via the journal part 50. The third cam part 32, the fourth cam part 34, and the journal part 50 are located above the second cylinder and in the intake side. The fifth cam part 34 and the sixth cam part 35 are eccentric cams provided for the third cylinder, and are adjacent to each other via the journal part 51. The fifth cam part 34, the sixth cam part 35, and the journal part 51 are located above the third cylinder and in the intake side. The seventh cam part 36 and the eighth cam part 37 are eccentric cams provided for the fourth cylinder, and are adjacent to each other via the journal part 52. The seventh cam part 36, the eighth cam part 37, and the journal part 52 are located above the fourth cylinder and in the intake side. The cam parts 30 to 37 are respectively provided with nose parts 30a to 37a (see FIGS. 1 and 6) in a one-by-one relationship, the nose parts 30a to 37a protruding from their respective base circles outwardly in a radial direction.

As described above, the firing order of the cylinders is as follows: the first cylinder, the third cylinder, the fourth cylinder, and the second cylinder. Accordingly, the cam parts 30 to 37 of the intake cam shaft 3 are disposed to have phase differences between the cam parts so that the intake valves are opened in the above firing order at every 90° rotation of the intake cam shaft 3.

The shaft part 48 of the intake cam shaft 3 includes a hole 38 located in a section between the sprocket mount part 28 and the first cam part 30 (this section corresponds to the "first section" of the present invention; this section may sometimes be referred to as the "first section" in the following description), a cam shaft identification ring 53 and a hole 39 located in a section between the second cam part 31 and the third cam part 32 (this section corresponds to the "second section" of the present invention; this section may sometimes be referred to as the "second section" in the following description), a rotational angle adjusting part 40 located between the fourth cam part 33 and the fifth cam part 34, a hole 41 located in a section between the sixth cam part 35 and the seventh cam part 36 (this section corresponds to the "second section" of the present invention; this section may sometimes be referred to as the "second section" in the following description), and a hole 42 located in a section between the eighth cam part 37 and the Oldham's coupling part 90 (this section corresponds to the "first section" of the present invention; this section may sometimes be referred to as the "first section" in the following description).

As illustrated in FIG. 6, the hole 38 includes a first hole 38a that is opened at a predetermined position on one side of the shaft part 48 in a radial direction and a second hole 38b that is opened at a predetermined position on another side of the shaft part 48 in the radial direction. Each of the first hole 38a and the second hole 38b extends in a length direction of the shaft part 48, and is gradually tapered from an outside of the shaft part 48 toward a center of the shaft part 48 in the radial direction in a manner similar to the hole 16 of the exhaust cam shaft 2. The first hole 38a is formed on a side close to an apex of the nose part 30a of the first cam part 30, specifically, at a position at which a phase (rotational phase) of the first hole 38a substantially coincides with the apex. The second hole 38b is formed on a side opposite to the nose part 30a of the first cam part 30, specifically, at a position at which a phase of the second hole 38b differs from the apex of the nose part 30a by approximately 180°. The first hole 38a and the second hole 38b correspond to a "first thickness-reduced part" of the present invention. In the following description, these holes 38a and 38b may sometimes be referred to as a "first thickness-reduced part".

As illustrated in FIG. 6, the hole 39 includes a first hole 39a that is opened at a predetermined position on one side of the shaft part 48 in the radial direction and a second hole 39b that is opened at a predetermined position on another side of the shaft part 48 in the radial direction. Each of the first hole 39a and the second hole 39b extends in the length direction of the shaft part 48, and is gradually tapered from the outside of the shaft part 48 toward the center of the shaft part 48 in the radial direction in a manner similar to the hole 17 of the exhaust cam shaft 2. In order to avoid interference with the cam shaft identification ring 53, each of the first hole 39a and the second hole 39b has a shorter length than lengths of the holes 17a and 17b of the exhaust cam shaft 2. The first hole 39a is formed at a position at which a phase of the first hole 39a is delayed from an apex of the nose part 32a (see FIG. 1) of the third cam part 32 by approximately 90°, and the second hole 39b is formed at a position at which a phase of the second hole 39b is advanced from the apex of the nose part 32a of the third cam part 32 by approximately 90°. The first hole 39a and the second hole 39b correspond to a "second thickness-reduced part" of the present invention. In the following description, these holes 39a and 39b may sometimes be referred to as a "second thickness-reduced part".

As illustrated in FIG. 6, the hole 41 includes a first hole 41a that is opened at a predetermined position on one side of the shaft part 48 in the radial direction and a second hole 41b that is opened at a predetermined position on another side of the shaft part 48 in the radial direction. Each of the first hole 41a and the second hole 41b extends in the length direction of the shaft part 48, and is gradually tapered from the outside of the shaft part 48 toward the center of the shaft part 48 in the radial direction in a manner similar to the hole 19 of the exhaust cam shaft 2. The first hole 41a is formed at a position at which a phase of the first hole 41a is advanced from an apex of the nose part 35a (see FIG. 1) of the sixth cam part 35 by approximately 90°, and the second hole 41b is formed at a position at which a phase of the second hole 41b is delayed from the apex of the nose part 35a of the sixth cam part 35 by approximately 90°. The first hole 41a and the second hole 41b correspond to a "second thickness-reduced part" of the present invention. In the following description, these holes 41a and 41b may sometimes be referred to as a "second thickness-reduced part".

As illustrated in FIG. 6, the hole 42 includes a first hole 42a that is opened at a predetermined position on one side of the shaft part 48 in the radial direction and a second hole 42b that is opened at a predetermined position on another side of the shaft part 48 in the radial direction. Each of the first hole 42a and the second hole 42b extends in the length direction of the shaft part 48, and is gradually tapered from the outside of the shaft part 48 toward the center of the shaft part 48 in the radial direction in a manner similar to those in the hole 41. Each of the first hole 42a and the second hole 42b has a shorter length than lengths of the holes 41a and 41b when viewed in the length direction of the shaft part 48. The first hole 42a is formed at a position at which a phase of the first hole 42a differs from an apex of the nose part 37a of the eighth cam part 37 by approximately 180°, and the second hole 42b is formed at a position at which a phase of the second hole 42b substantially coincides with the apex of the nose part 37a of the eighth cam part 37. The first hole 42a and the second hole 42b correspond to a "first thickness-reduced part" of the present invention. In the following description, these holes 42a and 42b may sometimes be referred to as a "first thickness-reduced part".

The holes denoted by the reference sign 61 in FIG. 1 are holes through which shaft parts of the intake valves for the first cylinder are inserted, the holes denoted by the reference sign 60 in FIG. 1 are holes through which shaft parts of the exhaust valves for the first cylinder are inserted, and the hole denoted by the reference sign 62 in FIG. 1 is a hole in which a fuel injection valve for the first cylinder is provided. Similarly, the holes denoted by the reference sign 64 are holes through which shaft parts of the intake valves for the second cylinder are inserted, the holes denoted by the reference sign 63 are holes through which shaft parts of the exhaust valves for the second cylinder are inserted, and the hole denoted by the reference sign 65 is a hole in which a fuel injection valve for the second cylinder is provided. The holes denoted by the reference sign 67 are holes through which shaft parts of the intake valves for the third cylinder are inserted, the holes denoted by the reference sign 66 are holes through which shaft parts of the exhaust valves for the third cylinder are inserted, and the hole denoted by the reference sign 68 is a hole in which a fuel injection valve for the third cylinder is provided. The holes denoted by the reference sign 91 are holes through which shaft parts of the intake valves for the fourth cylinder are inserted, the holes denoted by the reference sign 69 are holes through which shaft parts of the exhaust valves for the fourth cylinder are inserted, and the hole denoted by the reference sign 71 is a hole in which a fuel injection valve for the fourth cylinder is provided.

As illustrated in FIG. 6, the sprocket mount part 28 has a hole 46 in a center part of the sprocket mount part 28 in the radial direction, the hole 46 extending in its axial direction (length direction). The Oldham's coupling part 90 has a hole 47 penetrating through an inside of the Oldham's coupling part 90 in the axial direction (length direction).

<Method for Manufacturing Exhaust Cam Shaft>

Next, with reference to FIGS. 8 to 10, a method for manufacturing the exhaust cam shaft 2 will be described. A method for manufacturing the intake cam shaft 3 is similar to the method for manufacturing the exhaust cam shaft 2. Therefore, description thereof is omitted.

Schematically, the method for manufacturing the exhaust cam shaft 2 includes a series of the steps of; preparing a pattern 83; manufacturing, with use of the pattern 83 and casting sand, a casting mold 84 (see FIG. 10) for casting; and casting an exhaust cam shaft 2 with use of the casting mold 84. The pattern 83 can be split into a one-side portion 80a in a radial direction (see FIG. 8) and an another-side portion 80b in the radial direction (see FIG. 9). The pattern 83 has a cam shaft pattern part 80 (see FIGS. 8 and 9) having the same shape as a shape of the exhaust cam shaft 2 when these portions 80a and 80b are combined to each other.

The following will describe details of each of the steps in the method for manufacturing the exhaust cam shaft 2.

(Step of Preparing Pattern)

First, a pattern 83 is prepared. The pattern 83 includes the cam shaft pattern part 80 (see FIGS. 8 and 9), a riser-part forming part 81 (see FIGS. 8 and 9) for forming a riser part 57 (see FIG. 10) of the casting mold 84, and a pouring-part forming part 82 (see FIGS. 8 and 9) for forming a pouring part 92 (see FIG. 10) of the casting mold 84. The pattern 83 can be split into a first pattern element 83a (see FIG. 8) and a second pattern element 83b (see FIG. 9). The riser-part forming part 81 is configured to be able to be split into a one-side portion 81a in the radial direction (see FIG. 8) and an another-side portion 81b in the radial direction (FIG. 9), and the pouring-part forming part 82 is configured to be able to be split into a one-side portion 82a in the radial direction (see FIG. 8) and an another-side portion 82b in the radial direction (FIG. 9).

A shaft part 85 of the pattern 83 has holes 57a, 57b, 57c (see FIG. 8), 59a, 59b, and 59c (see FIG. 9) that are opened at respective predetermined positions on an outer circumferential surface of the shaft part 85. The holes 57a, 57b, 57c, 59a, 59b, and 59c are gradually tapered from an outside of the shaft part 85 of the pattern 83 toward a center of the shaft part 85 in the radial direction. The holes 57a, 57b, 57c, 59a, 59b, and 59c of the pattern 83 correspond to the holes 16a, 17a, 19a, 16b, 17b, and 19b of the exhaust cam shaft 2, respectively.

Figure 8:
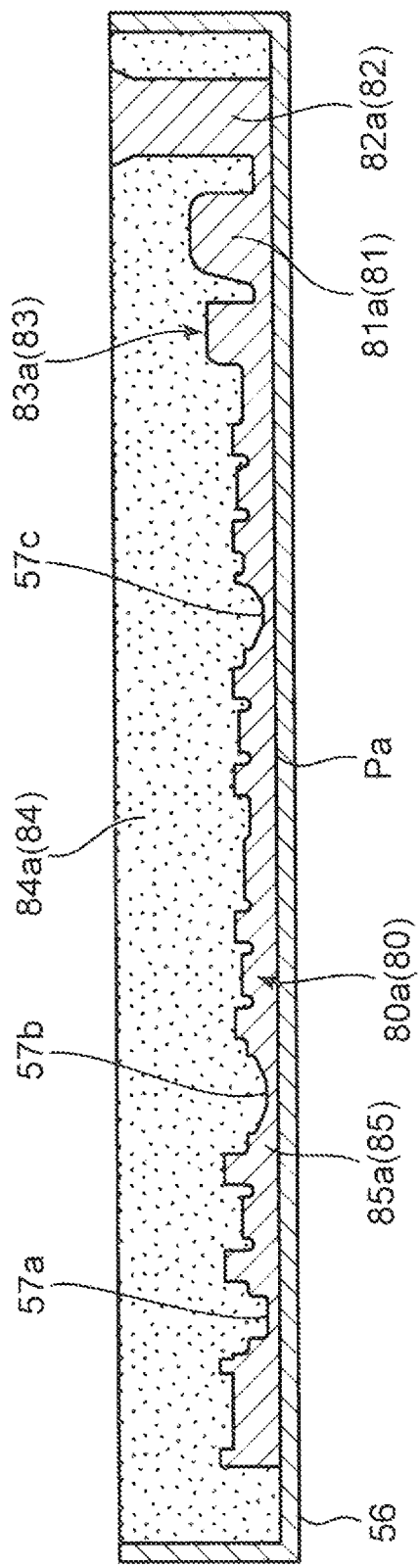
FIG. 8 is a cross-sectional view illustrating how a first sand mold which constitutes a casting mold is manufactured.

In the example illustrated in FIG. 8, the first pattern element 83a of the pattern 83 includes the one-side portion 80a in the radial direction of the cam shaft pattern part 80, the one-side portion 81a in the radial direction of the riser-part forming part 81, and the one-side portion 82a in the radial direction of the pouring-part forming part 82. A shaft part 85a in the one-side portion 80a in the radial direction of the cam shaft pattern part 80 has the holes 57a, 57b, and 57c. The first pattern element 83a is formed such that the holes 57a, 57b, and 57c are opened straight upward when the first pattern element 83a is placed in a first casting flask 56 (described later) with a split plane Pa of the first pattern element 83a facing downward.

Figure 9:
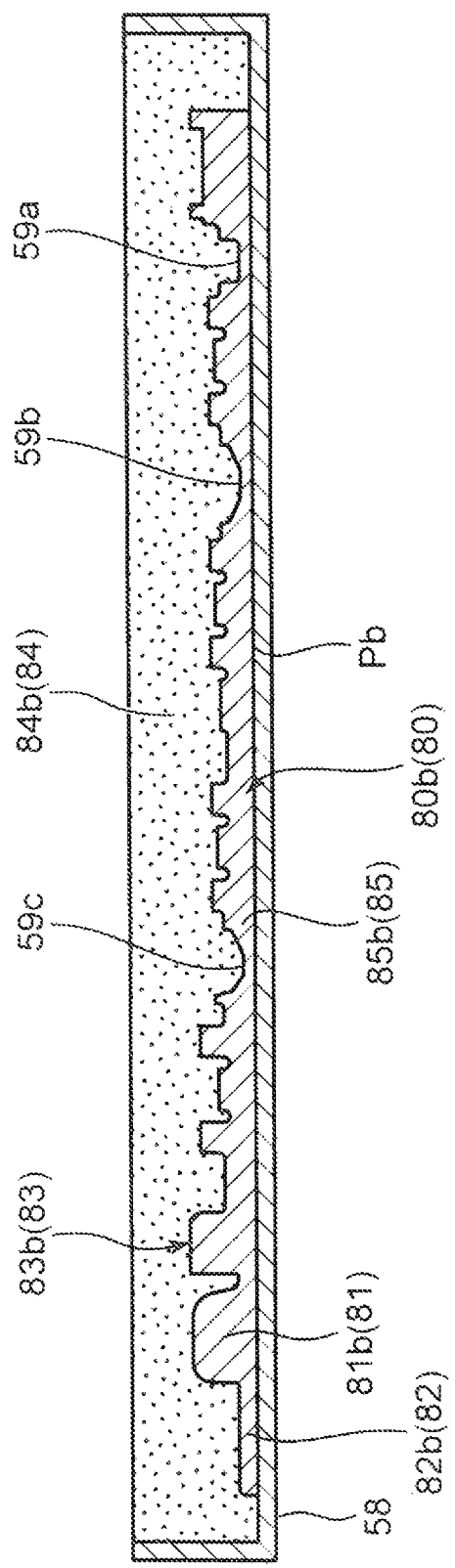
FIG. 9 is a cross-sectional view illustrating how a second sand mold which constitutes the casting mold is manufactured.
Figure 10:
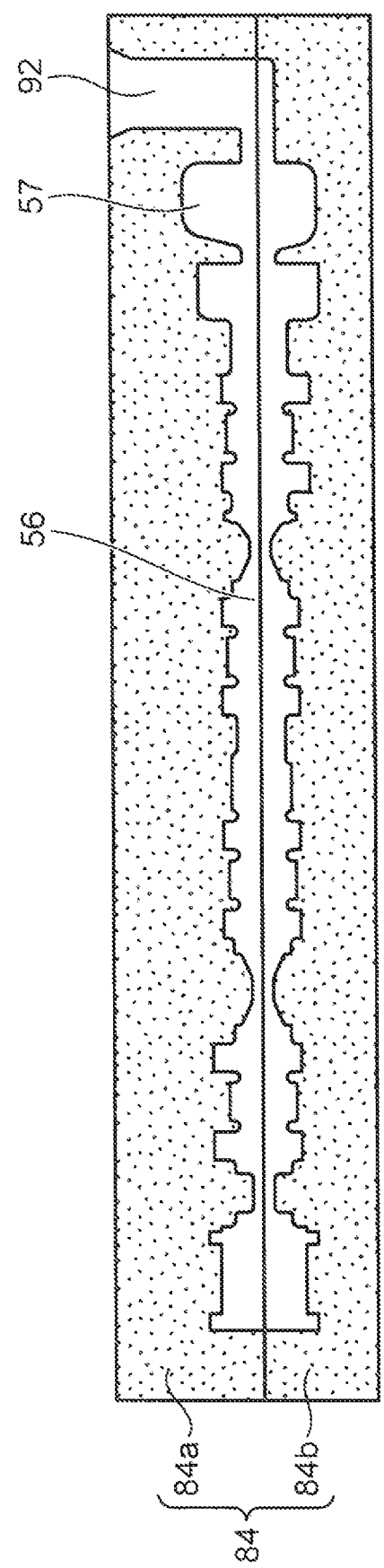
FIG. 10 is a cross-sectional view illustrating the casting mold made of a combination of the first sand mold and the second sand mold.

In the example illustrated in FIG. 9, the second pattern element 83b of the pattern 83 includes the other-side portion 80b in the radial direction of the cam shaft pattern part 80, the other-side portion 81b in the radial direction of the riser-part forming part 81, and the other-side portion 82b in the radial direction of the pouring-part forming part 82. A shaft part 85b in the other-side portion 80b in the radial direction of the cam shaft pattern part 80 has the holes 59a, 59b, and 59c. The second pattern element 83b is formed such that the holes 59a, 59b, and 59c are opened straight upward when the second pattern element 83b is placed in a second casting flask 58 (described later) with a split plane Pb of the second pattern element 83b facing downward.

(Step of Manufacturing First Sand Mold)

After the pattern 83 is prepared, the first pattern element 83a of the pattern 83 is placed in the first casting flask 56, as illustrated in FIG. 8. During this, the first pattern element 83a is placed in the first casting flask 56 with the split plane Pa of the first pattern element 83a facing downward so that the holes 57a, 57b, and 57c are opened straight upward. Then, casting sand is charged into the first casting flask 56. The casting sand is self-hardening casting sand that is hardened upon heating, and is prepared by mixing sand that is aggregate with a binder made of a thermosetting resin and various additives.

After the charging of the casting sand, the casting sand is heated, so that the casting sand is hardened. Then, the first pattern element 83a of the pattern 83 is pulled out from the hardened casting sand, and the first casting flask 56 is removed from the hardened casting sand. Consequently, a first sand mold 84a made of the hardened casting sand is manufactured. Note that the removal of the first pattern element 83a and the removal of the first casting flask 56 from the hardened casting sand may be simultaneous or either one may precede the other.

The holes 57a, 57b, and 57c of the first pattern element 83a of the pattern 83 are gradually tapered from the outside of the shaft part 85 toward the center of the shaft part 85 in the radial direction. Furthermore, the first pattern element 83a is placed in the first casting flask 56 so that the holes 57a, 57b, and 57c are opened straight upward. Therefore, it is possible to pull the first pattern element 83a of the pattern 83 out of the hardened casting sand without having the casting sand having been hardened in the holes 57a, 57b, and 57c to be caught by the holes 57a, 57b, and 57c, so that the first sand mold 84a made of the hardened casting sand is manufactured.

(Step of Manufacturing Second Sand Mold)

In a manner similar to that of the first pattern element 83a, a second pattern element 83b of the pattern 83 is placed in a second casting flask 58 as illustrated in FIG. 9, casting sand is charged into the second casting flask 58 and is hardened by heating, and the second pattern element 83b is pulled out of the hardened casting sand. Then, the second casting flask 58 is removed from the hardened casting sand. Consequently, a second sand mold 84b made of the hardened casting sand is manufactured. Also in the manufacturing of the second sand mold 84b as well as in the manufacturing of the first sand mold 84a, it is possible to pull the second pattern element 83b out of the hardened casting sand without having the casting sand having been hardened in the holes 59a, 59b, and 59c to be caught by the holes 59a, 59b, and 59c, so that the second sand mold 84b made of the hardened casting sand is manufactured. Note that the removal of the second pattern element 83b and the removal of the second casting flask 58 from the hardened casting sand may be simultaneous or either one may precede the other.

(Step of Manufacturing Casting Mold)

After the first sand mold 84a and the second sand mold 84b are manufactured, the first sand mold 84a and the second sand mold 84b are combined to each other, so that the casting mold 84 having a cavity 56 (see FIG. 10) in which an exhaust cam shaft 2 is to be casted is manufactured.

(Step of Pouring)

Subsequently, a molten metal that is a material of the exhaust cam shaft 2 is poured into the pouring part 92 (see FIG. 10), so that the molten metal is flowed into the cavity 56 via the riser part 57. Then, the molten metal is cooled and hardened.

(Step of Taking Out Cam Shaft)

Subsequently, the casting mold 84 is caused to collapse and is removed, so that the exhaust cam shaft 2 is taken out of the casting mold 84. Thus, the exhaust cam shaft 2 is manufactured.

Effects of the Present Embodiment

The exhaust cam shaft 2 and the method for manufacturing the exhaust cam shaft 2 according to the present embodiment can bring about the following effects. Note that the intake cam shaft 3 and the method for manufacturing the intake cam shaft 3 bring about similar effects. However, description of these effects is omitted for avoiding redundancy.

According to the present invention, as illustrated in FIG. 5, the shaft part 5 of the exhaust cam shaft 2 has the holes 16a, 17a, 19a, 16b, 17b, and 19b that are opened at respective predetermined positions on the outer circumferential surface of the shaft part 5. Thus, the weight of the exhaust cam shaft 2 having such a configuration can be reduced by a weight corresponding to volumes of the holes such as the hole 16a, as compared to a configuration not including the holes such as the hole 16a.

Furthermore, the holes 16a, 17a, 19a, 16b, 17b, and 19b are gradually tapered from the outside of the shaft part 5 of the exhaust cam shaft 2 toward the center of the shaft part 5 in the radial direction. Thus, it is possible to ensure manufacturing of the casting mold 84 (see FIG. 10) for manufacturing the exhaust cam shaft 2, and to favorably cast the exhaust cam shaft 2 with use of the casting mold 84.

This will be described in detail below. The casting mold 84 is manufactured with use of the pattern 83 that can be split into the first pattern element 83a corresponding to a one-side portion of the exhaust cam shaft 2 in the radial direction and the second pattern element 83b corresponding to an another-side portion of the exhaust cam shaft 2 in the radial direction. Specifically, with the first pattern element 83a of the pattern 83 being placed in the first casting flask 56 (see FIG. 8), casting sand is charged into the first casting flask 56 and is hardened. Then, the first pattern element 83a and the first casting flask 56 are removed from the hardened casting sand. Consequently, the first sand mold 84a is manufactured. Similarly, with the second pattern element 83b of the pattern 83 being placed in the second casting flask 58 (see FIG. 9), casting sand is charged into the second casting flask 58 and is hardened. Then, the second pattern element 83b and the second casting flask 58 are removed from the hardened casting sand. Consequently, the second sand mold 84b is manufactured. Then, the first sand mold 84a and the second sand mold 84b are combined to each other, so that the casting mold 84 is manufactured (see FIG. 10).

The holes 16a, 17a, 19a, 16b, 17b, and 19b of the exhaust cam shaft 2 are gradually tapered from the outside of the shaft part 5 of the exhaust cam shaft 2 toward the center of the shaft part 5 in the radial direction. Accordingly, the holes 57a, 57b, 57c, 59a, 59b, and 59c of the pattern 83 are also gradually tapered from the outside of the shaft part 85 toward the center of the shaft part 85 in the radial direction. The tapered shapes of the holes 57a, 57b, 57c, 59a, 59b, and 59c of the pattern 83 serve to provide a draft angle. Therefore, in the step of manufacturing the first sand mold 84a, the first pattern element 83a can be easily removed from the hardened casting sand, so that the first sand mold 84a is manufactured. The second sand mold 84b is manufactured in a manner similar to the above. Therefore, it is possible to ensure casting of the exhaust cam shaft 2 having the holes 16a, 17a, 19a, 16b, 17b, and 19b with use of the first sand mold and the second sand mold. Furthermore, it is not necessary to use a core as those described in Patent Literature 1, and a casting mold component for accurate positioning of the core with respect to the main mold is not necessary, either. This makes it possible to reduce the number of casting mold components for casting of the exhaust cam shaft 2. Thus, the exhaust cam shaft 2 can be manufactured easily.

In addition, according to the present embodiment, the first hole 16a of the exhaust cam shaft 2 is provided at the position at which the first hole 16a is symmetric to the second hole 16b with respect to the center line of the shaft part of the exhaust cam shaft 2, and has the same shape as the shape of the second hole 16b. Thus, the holes 16a and 16b can be respectively placed in the one side of the exhaust cam shaft 2 in the radial direction and the other side of the exhaust cam shaft 2 in the radial direction in a good balance. Accordingly, a strength of the shaft part 5 can be achieved in a good balance between the one side in the radial direction and the other side in the radial direction.

Furthermore, the present embodiment has an advantage of being able to effectively reduce deformation of the shaft part 5 of the exhaust cam shaft 2 for the following reasons. That is, a stress occurring in the shaft part 5 in response to the shaft part 5 receiving forces from the cam parts 6 to 13 (a stress to twist the shaft part 5 and a stress to bend the shaft part 5) varies depending on the position of the shaft part 5 in the axial direction (length direction). Specifically, a stress occurring in the second section (the section between the cam parts 7 and 8 and the section between the cam parts 11 and 12) is greater than a stress occurring in the first section (the section between the sprocket mount part 4 and the cam part 6). A reason for this is as follows. That is, portions of the shaft part 5 closer to the cam parts 6 to 13 receive greater forces transmitted from the cam parts 6 to 13. Another reason is as follows. That is, the first section receives the force transmitted only from one side in the axial direction, whereas the second section receives the force transmitted from both sides in the axial direction.

In terms of this, in the present embodiment, the first thickness-reduced part (the holes 16a and 16b) and the second thickness-reduced part (the holes 17a, 17b, 19a, and 19b) are formed so that a strength of the second section (between the second cam part 7 and the third cam part 8) of the shaft part 5 is greater than a strength of the first section (between the sprocket mount part 4 and the first cam part 6) of the shaft part 5. This makes it possible to reduce deformation of the second section of the shaft part 5, even if a greater stress occurs in the second section than in the first section. Consequently, it is possible to effectively reduce occurrence of a disadvantage such as a variation in valve lift degree between the cylinders.

In addition, according to the present embodiment, the first thickness-reduced part (the holes 16a and 16b) and the second thickness-reduced part (the holes 17a, 17b, 19a, and 19b) are non-through holes that are opened in the outer circumferential surface of the shaft part 5. Thus, it is possible to easily form these thickness-reduced parts. Furthermore, a depth of the second thickness-reduced part is smaller than a depth of the first thickness-reduced part. Thus, the strength of the second section (between the second cam part 7 and the third cam part 8) of the shaft part 5 can be easily and reliably made greater than the strength of the first section (between the sprocket mount part 4 and the first cam part 6) of the shaft part 5.

Moreover, the first thickness-reduced part has a constant depth in a length direction of the first thickness-reduced part. Thus, the first section has a certain section in which the first thickness-reduced part is formed, and a strength of the certain section of the shaft part 5 can be made substantially constant. Meanwhile, a portion of the second thickness-reduced part, which portion is close to the cam parts 7 and 8, has a smaller depth. Thus, a strength of the shaft part 5 at a position (a position close to the cam parts 7 and 8) of the second section (between the second cam part 7 and the third cam part 8) where a stress is relatively great can be made greater than a strength of the shaft part 5 in another position (a position farther from the cam parts 7 and 8) of the second section where a stress is relatively small. Thus, the strength of the second section of the shaft part 5 can be easily made greater than the strength of the first section of the shaft part 5.

Other Embodiments

The embodiments of the exhaust cam shaft 2, the intake cam shaft 3, and the methods for manufacturing the exhaust cam shaft 2 and the intake cam shaft 3 have been thus described. However, the embodiments can be modified as below.

According to the embodiment described above, the depth of the first hole 16a is set to be equal to the depth of the second hole 16b (see FIG. 7A). Alternatively, the depth of the second hole 16b may be set to be smaller than the depth of the first hole 16a. In this case, it is possible to form the holes 16a and 16b so that each of the holes 16a and 16b has an appropriate depth according to a stress applied to the shaft part 5, and thus to reduce deformation of the shaft part 5. Similarly, in the intake cam shaft 3 according to the embodiment described above, the depth of the first hole 38a is set to be equal to the depth of the second hole 38b (see FIG. 6). Alternatively, the depth of the second hole 38b may be set to be smaller than the depth of the first hole 38a. In this case, it is possible to form the holes 38a and 38b so that each of the holes 38a and 38b has an appropriate depth according to a stress occurring with respect to the shaft part 48, and thus to reduce deformation of the shaft part 5.

Figure 11A:
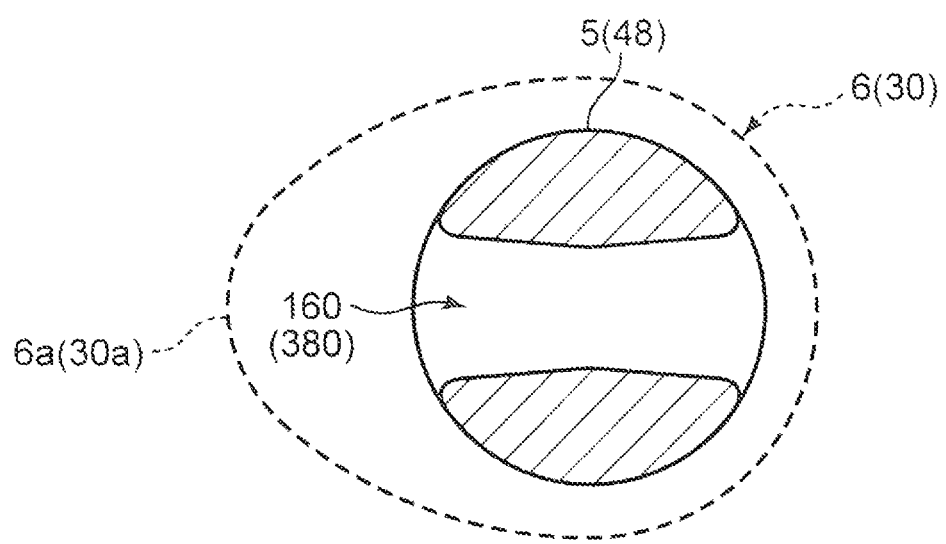
FIG. 11A is a cross-sectional view of a hole of an exhaust cam shaft according to a first modification.

In addition, according to the embodiment described above, the hole 16 (the first hole 16a and the second hole 16b) of the exhaust cam shaft 2 is a non-through hole. Alternatively, the hole 16 may be a hole penetrating through the shaft part 5 in the radial direction like a hole 160 illustrated in FIG. 11A. Similarly, according to the embodiment described above, the hole 38 (the first hole 38a and the second hole 38b) of the intake cam shaft 3 is a non-through hole. Alternatively, the hole 38 may be a hole penetrating through the shaft part 48 in the radial direction like a hole 380 illustrated in FIG. 11A. The hole 42 of the intake cam shaft 3 can be modified in a similar manner. Also in this case, each of a one-side portion of the hole 160 (380) in a radial direction and an another-side portion of the hole 160 (380) in the radial direction is gradually tapered from an outside toward a center in the radial direction. In this case, the one-side portion of the hole 160 (380) in the radial direction is casted with a first sand mold having a portion conformed to the shape of this portion, and the other-side portion of the hole 160 in the radial direction is casted with a second sand mold having a portion conformed to the shape of this portion. The hole 160 (380) configured as above has a volume greater than a volume of the hole 160 (380) configured as a non-through hole. Thus, the above configuration makes it possible to further reduce the weights of the cam shafts 2 and 3. In addition, as for the intake cam shaft 3, the hole 380 configured to penetrate through the shaft part 48 allows to ensure reduction of a strength of the first section (between the sprocket mount part 28 and the first cam part 30) of the shaft part 48, as compared to a strength of the second section (between the second cam part 31 and the third cam part 32) of the shaft part 48. Consequently, a strength of the second section of the shaft part 48 can be easily and reliably made greater than a strength of the first section of the shaft part 48.

Figure 11B:
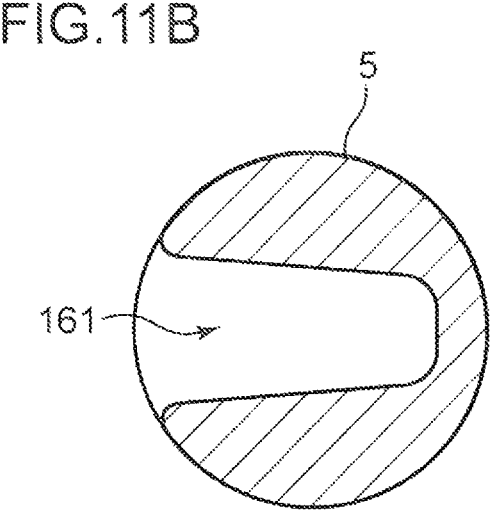
FIG. 11B is a cross-sectional view of a hole of an exhaust cam shaft according to a second modification.
Figure 11C:
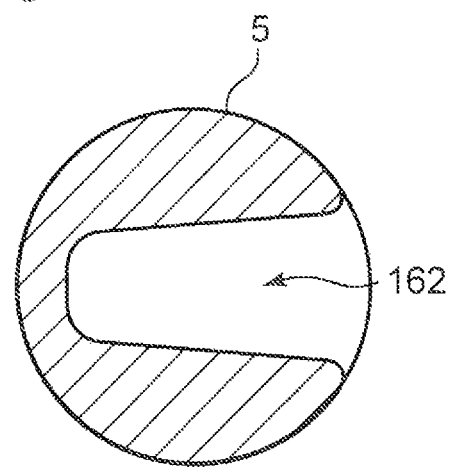
FIG. 11C is a cross-sectional view of a hole of an exhaust cam shaft according to a third modification.

In addition, in the embodiment described above, the hole 16 of the exhaust cam shaft 2 includes the first hole 16a, which is a non-through hole opened at a predetermined position on the one side of the shaft part 5 in the radial direction, and the second hole 16b, which is a non-through hole opened at a predetermined position on the other side of the shaft part 5 in the radial direction. Alternatively, in a manner similar to a hole 161 illustrated in FIG. 11B, the hole may include only a non-through hole that is opened on one side of a shaft part 5 in a radial direction and that extends toward another side of the shaft part 5 in the radial direction. In this case, the hole 161 is gradually tapered from the one side in the radial direction toward the other side in the radial direction. As illustrated in FIG. 11B, the hole 161 may extend to a position extending beyond a center part in the radial direction. In this case, the hole 161 is casted with a first sand mold having a portion conformed to a shape of the hole 161. Alternatively, in a manner similar to a hole 162 illustrated in FIG. 11C, the hole may include only a non-through hole that is opened on the other side of the shaft part 5 in the radial direction and that extends toward the one side in the radial direction.

Figure 12A:
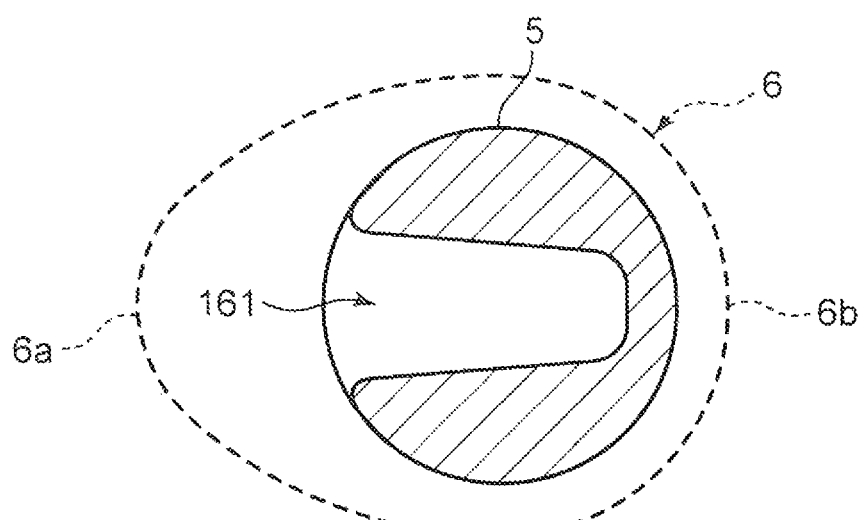
FIG. 12A is a cross-sectional view of an exhaust cam shaft for illustrating one example of a positional relationship between the hole illustrated in FIG. 11B and a nose part of a cam part.

In addition, in the case where the hole 161 illustrated in FIG. 11B is formed, an opening part of the hole 161 may be formed on a side on which an apex of a nose part 6a of a first cam part 6 is disposed, as illustrated in FIG. 12A. In this case, it is possible to form the hole 161 at an appropriate position according to a stress applied to the shaft part 5, and thus to reduce deformation of the shaft part 5.

Figure 12B:
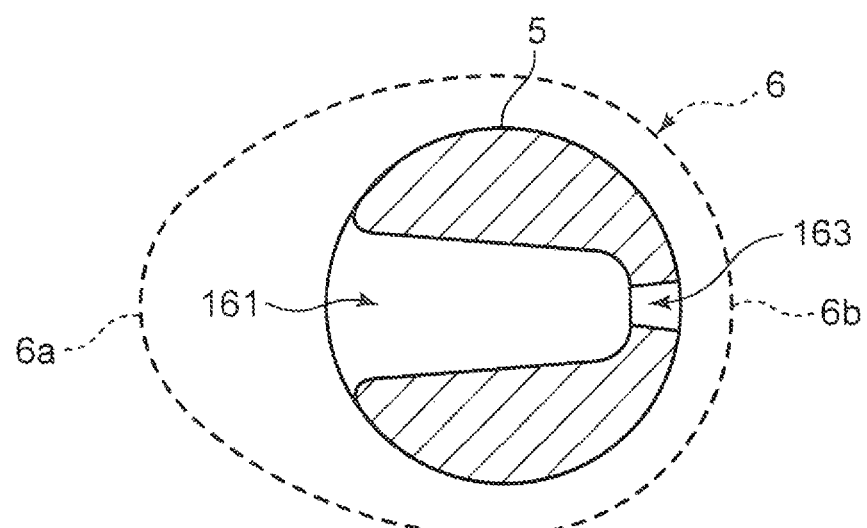
FIG. 12B is a cross-sectional view of an exhaust cam shaft for illustrating a positional relationship between a hole according to a fourth modification and a nose part of a cam part.

Alternatively, as illustrated in FIG. 12B, the hole 161 illustrated in FIG. 12A and a hole 163 that is opened on another side of a shaft part 5 in a radial direction and that extends toward one side in the radial direction may be communicated with each other. In the example illustrated in FIG. 12B, the hole 163 has a width smaller than a width of the hole 161, and is gradually tapered from an outside toward a center in the radial direction. In this case, the hole 161 can be casted with a first sand mold having a portion conformed to a shape of the hole 161, and the hole 163 can be casted with a second sand mold having a portion conformed to a shape of the hole 163.

Note that the configurations illustrated in FIGS. 11B, 11C, 12A, and 12B are applicable also to the hole 38 of the intake cam shaft 3.

Figure 13:
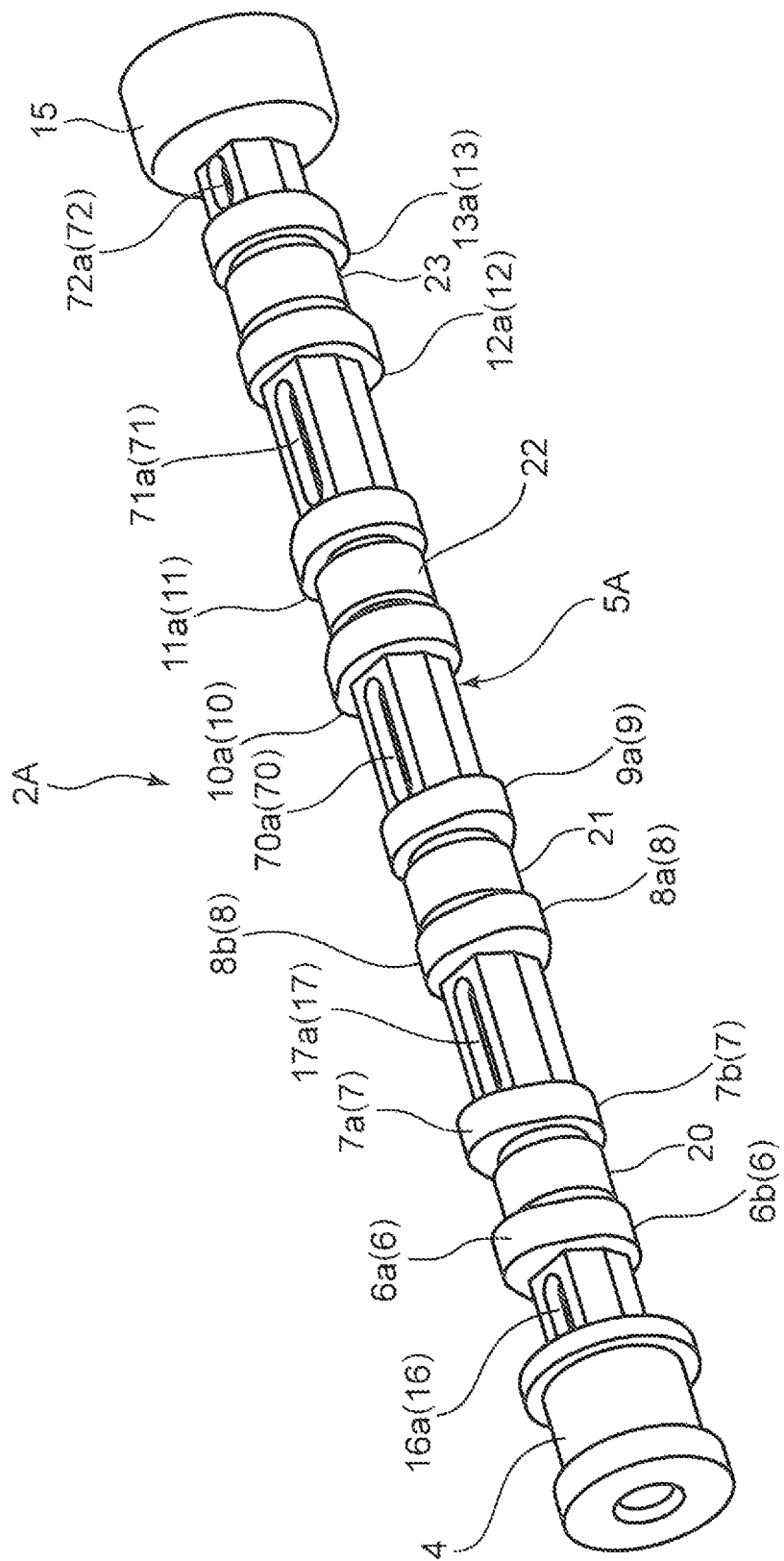
FIG. 13 is a perspective view of an exhaust cam shaft including a shaft part having a hexagonal cross section.

According to the embodiment described above, the shaft part 5 of the exhaust cam shaft 2 has a circular cross section. Alternatively, as illustrated in FIG. 13, the shaft part 5 may have a hexagonal (regular hexagonal) cross section. In this case, one of apexes of the hexagon is disposed at a position opposite to an apex of a nose part 8a of a third cam part 8 with respect to a center line of a shaft part 5A, specifically, at a position at which a phase of the one apex differs from a phase of the apex of the nose part 8a by approximately 180°. In this case, the apexes of the hexagon of the shaft part 5A can be disposed at appropriate positions relative to the nose part 8a of the third cam part 8. Thus, it is possible to reduce deformation of the shaft part 5A.

In the example illustrated in FIG. 13, a rotational angle adjusting part and a cam shaft identification ring are not provided. In the shaft part 5A, a hole 70 including a first hole 70a and a second hole (not shown) is provided between a fourth cam part 9 and a fifth cam part 10, a hole 71 including a first hole 71a and a second hole (not shown) is provided between a sixth cam part 11 and a seventh cam part 12, and a hole 72 including a first hole 72a and a second hole (not shown) is provided between an eighth cam part 13 and an Oldham's coupling part 15. Each of the holes 70, 71, and 72 is a hole having a cross section of a substantially V-shape, similarly to the hole 17. Each of the holes 70 and 71 has a length substantially equal to a length of the hole 17, and the hole 72 has a length shorter than the length of the hole 17.

In the shaft part 5A having such a hexagonal cross-section configuration, a volume of the shaft part can be reduced as compared with the above-described shaft part 5 having the circular cross-section configuration (a circle circumscribing the above-described polygon). Consequently, it is possible to further reduce the weight of the exhaust cam shaft.

Figure 14:
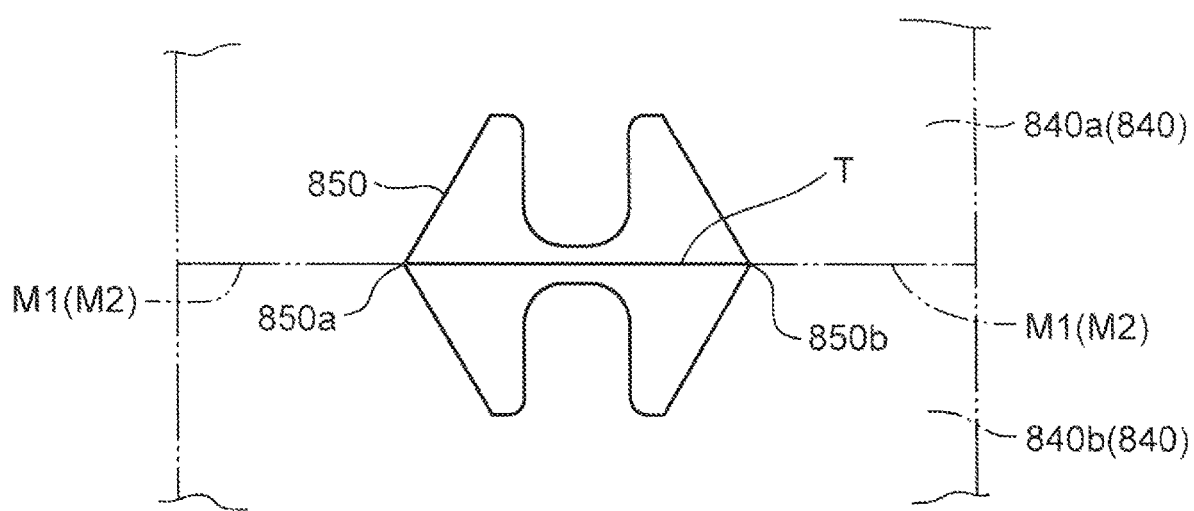
FIG. 14 is a cross-sectional view illustrating a positional relationship between a pattern (shaft part) of the exhaust cam shaft illustrated in FIG. 13 and first and second sand molds.

In addition, in this case, as illustrated in FIG. 14, a shaft part 850 of a pattern of an exhaust cam shaft 2A has a hexagonal cross section. Furthermore, a first sand mold 840a and a second sand mold 840b which constitute a casting mold 840 are configured to have respective parting planes M1 and M2 each being a part of a flat plane passing through a center of the shaft part 850 in a radial direction and two apexes 850a and 850b of apexes of the hexagon of the shaft part 850. In other words, each of the first sand mold 840a and the second sand mold 840b has, as the parting plane, a part of a flat plane passing through a center of the shaft part 5A of an exhaust cam shaft 2A in a radial direction and the two apexes. The straight line denoted by the reference sign T in FIG. 14 is a diagonal line connecting the two apexes to each other and corresponding to a split plane of the shaft part 850.

By the configuration including such parting planes M1 and M2, it is possible to prevent, in manufacturing of the first sand mold 840a and the second sand mold 840b, a case where the first sand mold 840a and the second sand mold 840b are not pulled out of hardened casting sand. Consequently, it is possible to ensure manufacturing of the first sand mold 840a and the second sand mold 840b, and to favorably cast the exhaust cam shaft 2A having the hole 16 and the like, by use of the casting mold 840 including the first sand mold 840a and the second sand mold 840b.

The configuration and the manufacturing method as those illustrated in FIG. 13 and FIG. 14 are applicable also to the intake cam shaft 3 and the method for manufacturing the intake cam shaft 3 in a manner similar to the above.

Note that, instead of the hexagonal cross-section configuration, the shaft part 5 of the exhaust cam shaft 2A (the shaft part 48 of the intake cam shaft 3) may have a quadrangle cross-section configuration (square cross-section configuration) or a polygonal cross-section configuration (regular polygonal cross-section configuration) having even number of apexes equal to or more than eight. Any of these configurations can also bring about effects similar to the effects achieved by the hexagonal cross-section configuration.

For the intake cam shaft 3, the embodiment can be modified as below. Similar modifications are applicable also to the exhaust cam shaft 2.

Figure 15:
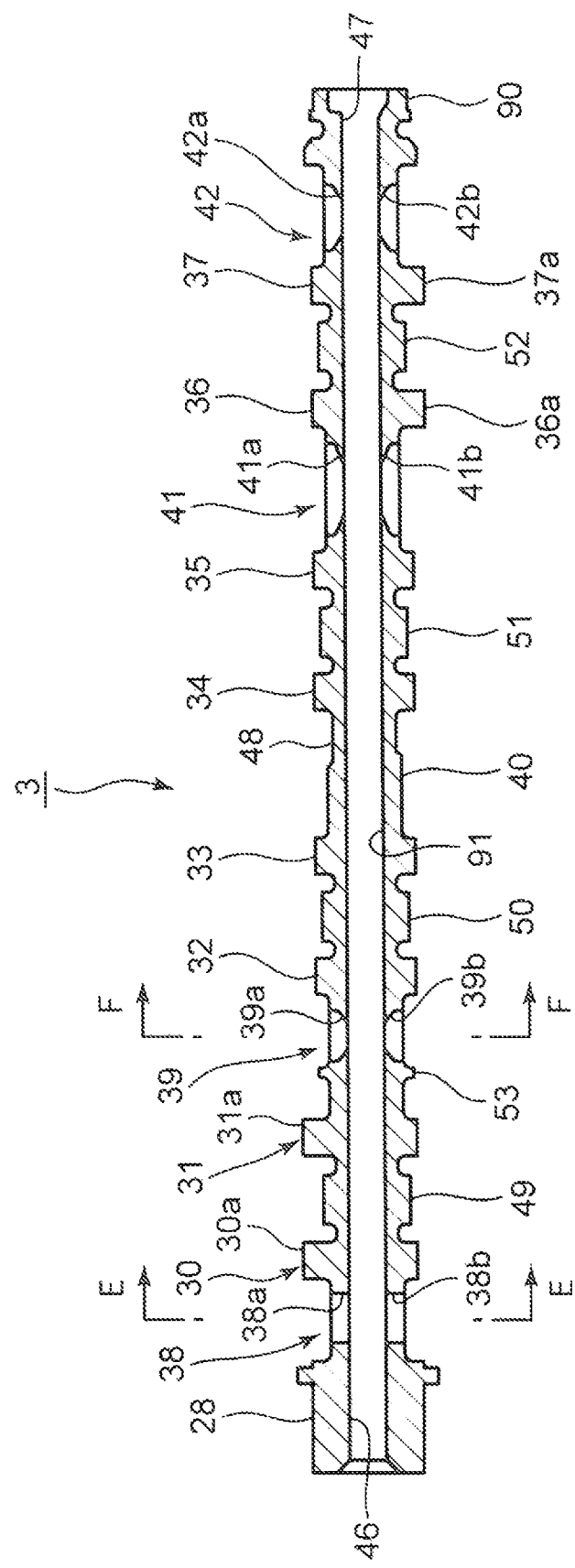
FIG. 15 is a cross-sectional view illustrating an intake cam shaft including a shaft part whose center part in a radial direction has a hollow part that is communicated with all holes opened on an outer circumferential surface of the shaft part.
Figure 16B:
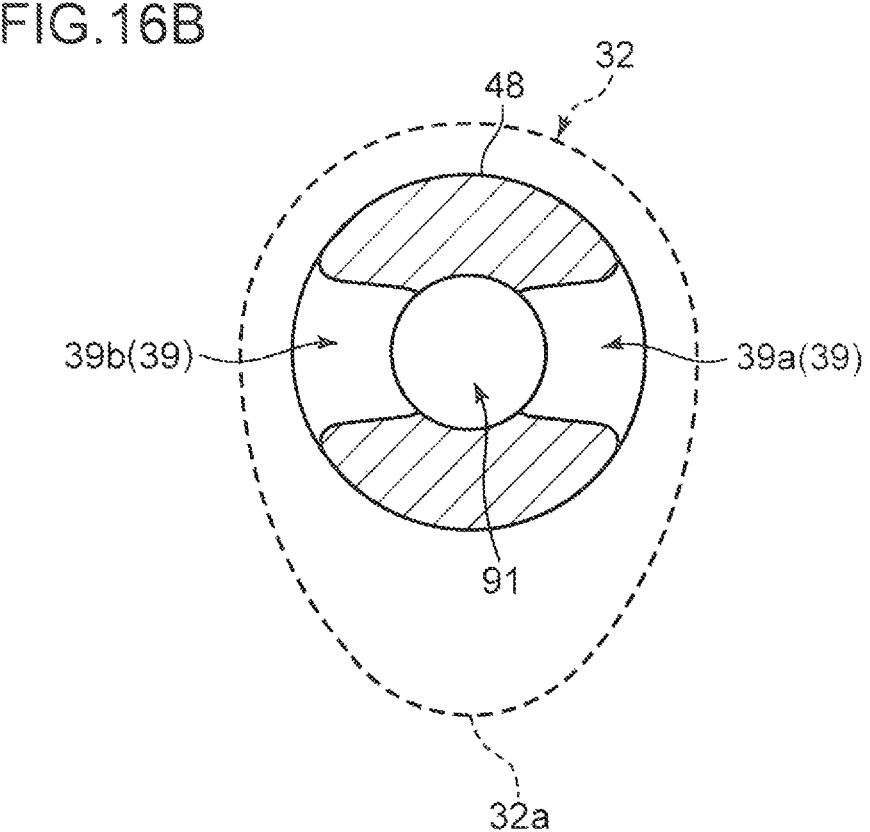
FIG. 16B is a cross-sectional view of the intake cam shaft illustrated in FIG. 15, taken along line F-F of FIG. 15.

In the embodiment described above, the shaft part 48 of the intake cam shaft 3 has a center part in a radial direction, which center part is solid. Alternatively, as illustrated in FIG. 15, the center part of the shaft part 48 in the radial direction may be hollow. In the example illustrated in FIG. 15, the center part of the shaft part 48 in the radial direction has a hollow part 91. The hollow part 91 extends in a length direction of the shaft part 48, has both ends communicated respectively with a hole 46 of the sprocket mount part 28 and a hole 47 of the Oldham's coupling part 90, and has a circular cross section. The hollow part 91 is communicated with the holes 38a, 38b, 39a, 39b, 41a, 41b, 42a, and 42b (see FIGS. 15, 16A, and 16B).

In this case, it is possible to further reduce the weight of the intake cam shaft 3 by a weight corresponding to a volume of the hollow part 91, as compared with the case where no hollow part 91 is provided.

Here, a method for manufacturing the intake cam shaft 3 illustrated in FIG. 15 will be described.

The manufacturing method includes the steps of casting a solid cam shaft (not shown) including a solid shaft part having a center part in a radial direction, the center part being solid, the solid shaft part having an outer circumference provided with the plurality of cam parts 30 to 37; and forming the hollow part 91 by cutting the center part of the solid shaft part in the radial direction with use of a rotary cutting tool (e.g., a gun drill). These steps will be described below.

(Step of Casting)

The step of casting includes steps similar to the steps in the above-described method for manufacturing the exhaust cam shaft 2, specifically, the steps of preparing a pattern, manufacturing a first sand mold, manufacturing a second sand mold, manufacturing a casting mold, pouring, and taking out a cam shaft. In addition, in the step of casting, the first thickness-reduced part (holes 38a, 38b, 42a, and 42b) and the second thickness-reduced part (holes 39a, 39b, 41a, and 41b) are formed. Each of these thickness-reduced parts has a size allowing chips occurring during the cutting by the rotary cutting tool to be discharged to the outside. Specifically, dimensions such as a width and an area of an opening of each of the thickness-reduced parts are set to values allowing the chips to pass through the opening.

(Step of Forming Hollow Part)

In the step of forming the hollow part, cutting is performed with use of a long rotary cutting tool, e.g., from one end of the solid cam shaft toward the other end of the solid cam shaft so that the sprocket mount part 28, the solid shaft part, and the Oldham's coupling part 90 are hollowed in an axial direction. As a result of the cutting, the hole 46, the hollow part 91, the hole 47 are formed. Furthermore, the cutting is performed such that the hollow part 91 is communicated with the first thickness-reduced part (the holes 38a, 38b, 42a, and 42b) and the second thickness-reduced part (the holes 39a, 39b, 41a, and 41b).

According to this method for manufacturing the intake cam shaft 3, the hollow part 91 is formed by cutting the center part of the solid shaft part in the radial direction with use of the rotary cutting tool. Therefore, it is not necessary to use a core in the step of casting in order to form the hollow part 91. Thus, it is possible to easily form the hollow part 91 at relatively low cost.

Furthermore, it is possible to quickly discharge chips occurring during the cutting to the outside via the first and second thickness-reduced parts. Consequently, it is possible to effectively enhance the efficiency of the cutting.

Note that the intake cam shaft 3 illustrated in FIG. 15 can be further modified as below.

Figure 17:
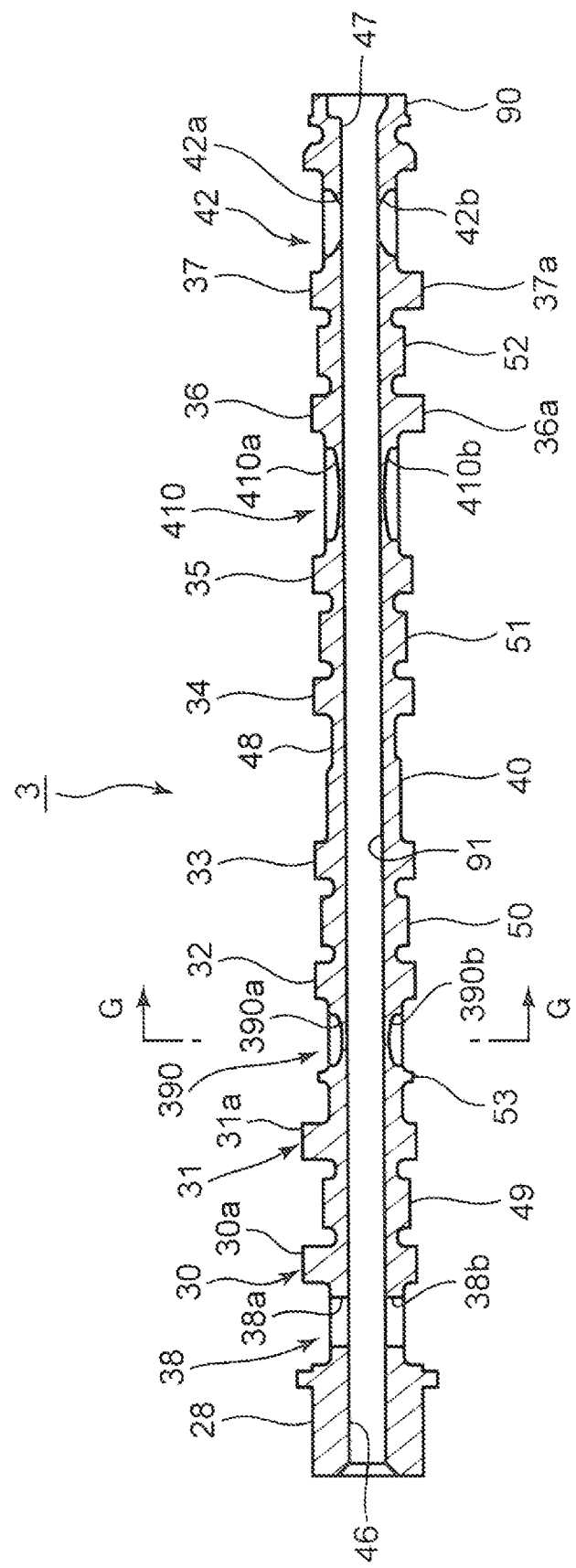
FIG. 17 is a cross-sectional view illustrating an intake cam shaft including a shaft part whose center in a radial direction has a hollow part that is communicated with a hole formed in a section between one end of the shaft part and a cam part closest to the one end and with a hole in a section between the other end of the shaft part and a cam part closest to the other end.
Figure 18:
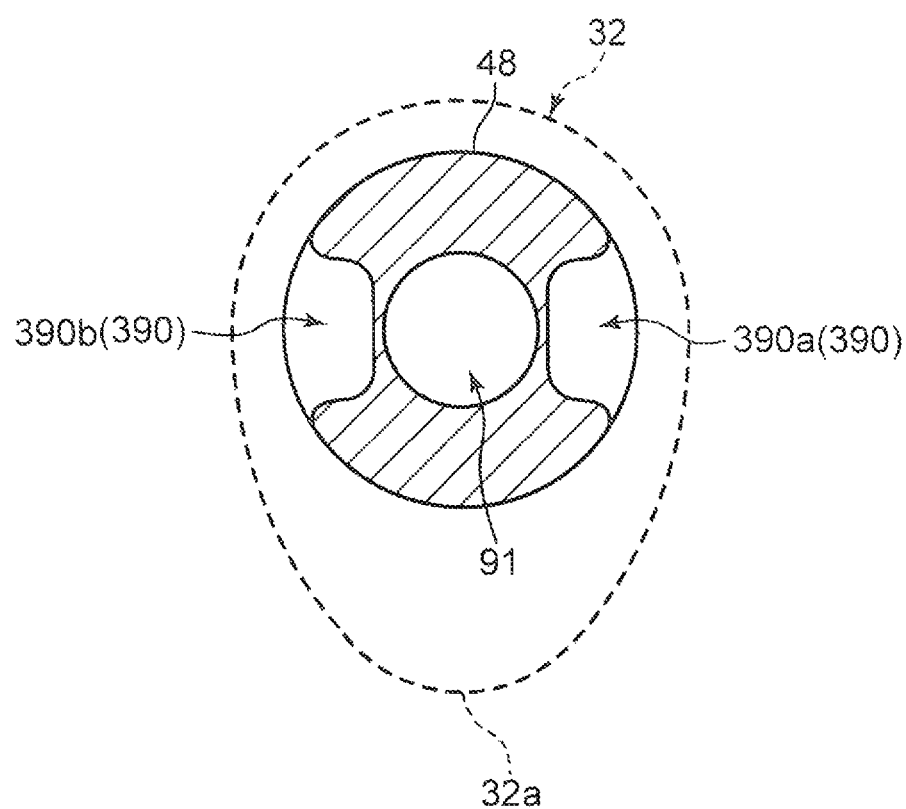
FIG. 18 is a cross-sectional view of the intake cam shaft illustrated in FIG. 17, taken along line G-G of FIG. 17.

In the example illustrated in FIGS. 17 and 18, among a first thickness-reduced part (holes 38a, 38b, 42a, and 42b) and a second thickness-reduced part (holes 390a, 390b, 410a, and 410b), only the first thickness-reduced part (the holes 38a, 38b, 42a, and 42b) is communicated with a hollow part 91, and the second thickness-reduced part (the holes 390a, 390b, 410a, and 410b) is not communicated with the hollow part 91. Specifically, depths of the first hole 390a and the second hole 390b, which constitute a hole 390, and depths of the first hole 410a and the second hole 410b, which constitute a hole 410, are set to be smaller than depths of the holes 38a, 38b, 42a, and 42b, and not to reach the hollow part 91.

In this case, it is possible to quickly discharge chips occurring during cutting of a solid shaft part to the outside via the first thickness-reduced part (the holes 38a, 38b, 42a, and 42b). Consequently, it is possible to enhance the efficiency of the cutting. In addition, in the second section (the section between a second cam part 31 and a third cam part 32, and the section between a sixth cam part 35 and a seventh cam part 36), it is possible to suppress reduction in a strength of a shaft part 48, which reduction may be caused by the configuration in which the second thickness-reduced part (the holes 39a, 39b, 41a, 41b) is communicated with the hollow part 91. Consequently, it is possible to more effectively reduce deformation of the second section of the shaft part 48.

In the embodiments described above, mainly, the depth of the second thickness-reduced part is smaller than the depth of the first thickness-reduced part so that the strength of the second section of the shaft part is greater than the strength of the first section of the shaft part. However, the present invention is not limited to such a configuration. Alternatively, for example, a width of a second thickness-reduced part may be smaller than a width of a first thickness-reduced part. Further alternatively, the number of second thickness-reduced parts may be smaller than the number of first thickness-reduced parts (i.e., the number of first thickness-reduced parts may be greater than the number of second thickness-reduced parts). Still further alternatively, both of these configurations may be employed. As an example of the configuration in which the number of first thickness-reduced parts is greater than the number of second thickness-reduced parts, a plurality of spline-shaped grooves may be formed on an outer peripheral surface of a shaft part.

The exhaust cam shaft 2 and the intake cam shaft 3 according to the embodiment described above are applied to the diesel engine with inline four cylinders. Alternatively, the exhaust cam shaft 2 and the intake cam shaft 3 according to the embodiment described above may be applied to diesel engines with other number of cylinders or to gasoline engines.

The present invention, which has been described according to the embodiments, is summarized as below.

The present invention is a cam shaft for an engine, the cam shaft being made by casting, the cam shaft including: a shaft part; and a cam part disposed on an outer circumference of the shaft part, wherein the shaft part has a hole that is opened at a predetermined position in an outer circumferential surface of the shaft part, and the hole is gradually tapered from an outside of the shaft part toward a center of the shaft part in a radial direction.

According to the above configuration, the shaft part of the cam shaft has the hole that is opened at the predetermined position in the outer circumferential surface of the shaft part. Consequently, it is possible to reduce a material of the cam shaft by an amount corresponding to a volume of the hole, and thus to reduce the weight of the cam shaft.

Furthermore, according to the above configuration, the hole is gradually tapered from the outside of the shaft part toward the center of the shaft part in the radial direction. Thus, it is possible to favorably cast the cam shaft according to a manufacturing method of the present invention as those described below.

The manufacturing method includes the steps of preparing a pattern of the cam shaft, the pattern including a first pattern element corresponding to a one-side portion of the cam shaft in a radial direction and a second pattern element corresponding to an another-side portion of the cam shaft in the radial direction; manufacturing a first sand mold by placing the first pattern element in a casting flask, charging casting sand into the casting flask, hardening the casting sand, and taking the first pattern element out of the casting sand having been hardened; manufacturing a second sand mold by placing the second pattern element in a casting flask, charging casting sand into the casting flask, hardening the casting sand, and taking the second pattern element out of the casting sand having been hardened; manufacturing a casting mold by combining the first sand mold and the second sand mold to each other, the casting mold having a cavity in which the cam shaft is to be casted; pouring a molten metal into the cavity and cooling down the molten metal to harden the molten metal; and taking the cam shaft out of the casting mold by causing the casting mold to collapse and removing the casting mold.

In order to cast the cam shaft, in the step of preparing the pattern, a pattern having a hole with the same shape as a shape of the above-described hole is prepared. That is, a shaft part of the pattern has a hole that is opened at a predetermined position in an outer circumferential surface of the shaft part and that is gradually tapered from an outside toward a center in a radial direction. The tapered shape of the hole serves to provide a draft angle. Therefore, in a case where the hole of the cam shaft is casted with the first sand mold, the first pattern element can be easily and reliably removed from the hardened casting sand. Thus, it is possible to ensure manufacturing of the first sand mold. This also applies to a case where the hole of the cam shaft is casted with the second sand mold. Therefore, it is possible to favorably manufacture the cam shaft having the above-described hole with use of the first sand mold and the second sand mold. Furthermore, it is not necessary to use a core as those described in Patent Literature 1 for reducing the weight of the cam shaft, in order to cast the cam shaft. Moreover, it is not necessary use a casting mold component for accurate positioning of the core with respect to the main mold. Therefore, it is possible to reduce the number of casting mold components, and to easily manufacture the cam shaft.

The above cam shaft is preferably configured such that the hole includes a first hole that is opened on one side of the shaft part in the radial direction and a second hole that is opened on another side of the shaft part in the radial direction, and each of the first hole and the second hole is gradually tapered from the outside of the shaft part toward the center of the shaft part in the radial direction.

According to the above configuration, each of the first hole and the second hole is gradually tapered from the outside of the shaft part toward the center of the shaft part in the radial direction. Consequently, it is possible to ensure manufacturing of a casting mold for casting the cam shaft in which the holes are respectively provided on the one-side portion of the shaft part in the radial direction and the other-side portion of the shaft part in the radial direction. Furthermore, it is possible to ensure casting of the cam shaft having the holes with use of this casting mold.

The above cam shaft is preferably configured such that the first hole is formed at a position at which the first hole is symmetric to the second hole with respect to a center line of the shaft part, and has a same shape as a shape of the second hole.

According to the above configuration, the holes can be respectively placed in the one side of the cam shaft in the radial direction and the other side of the cam shaft in the radial direction in a good balance. Accordingly, a strength of the shaft part can be achieved in a good balance between the one side in the radial direction and the other side in the radial direction.

The above cam shaft is preferably configured such that the hole penetrates through the shaft part in the radial direction.

According to the above configuration, it is possible to increase a volume of the hole, and thus to further reduce the weight of the cam shaft.

The above cam shaft is preferably configured such that the cam part has a nose part protruding from a base circle outwardly in the radial direction, and the hole is a non-through hole extending in the radial direction from a predetermined position in a portion of the shaft part, the portion being close to the nose part.

According to the above configuration, it is possible to form the hole at an appropriate position according to a stress applied to the shaft part, and thus to reduce deformation of the shaft part. Specifically, the shaft part has a certain portion in which the cam part is provided. Apart of the certain portion and its surroundings, which part is opposite to the nose part in the radial direction, is subjected to a greater stress than a stress applied to a part of the certain portion and its surroundings, which part is close to the nose part. According to the above configuration, the hole is a non-through hole extending in the radial direction from the predetermined position in the shaft part, the predetermined position being close to the nose part. Thus, the portion of the shaft part, which portion is opposite to the nose part in the radial direction, has a greater strength than a strength of the portion close to the nose part. Consequently, it is possible to reduce deformation of the shaft part.

The above cam shaft is preferably configured such that the cam part has a nose part protruding from a base circle outwardly in the radial direction, the hole includes a third hole extending in the radial direction from a predetermined position in a portion of the shaft part, which portion is close to the nose part, and a fourth hole extending in the radial direction from a predetermined position in a portion of the shaft part, which portion is opposite to the nose part in the radial direction, and the fourth hole has a smaller depth than a depth of the third hole.

According to the above configuration, it is possible to form the hole having an appropriate depth according to a stress applied to the shaft part, and thus to reduce deformation of the shaft part. Specifically, the shaft part has a certain portion in which the cam part is provided. A part of the certain portion and its surroundings, which part is opposite to the nose part in the radial direction, is subjected to a greater stress than a stress applied to a part of the certain portion and its surroundings, which part is close to the nose part. According to the above configuration, the fourth hole extending in the radial direction from the predetermined position in the portion of the shaft part, which portion is opposite to the nose part in the radial direction, has a smaller depth than the depth of the third hole extending in the radial direction from the predetermined position in the portion of the shaft part, which portion is close to the nose part. Thus, the portion of the shaft part, which portion is opposite to the nose part in the radial direction, has a greater strength than a strength of the portion close to the nose part. Consequently, it is possible to reduce deformation of the shaft part.

The above cam shaft is preferably configured such that the shaft part has a polygonal cross-section configuration having even number of apexes equal to or more than four, the cam part has a nose part protruding from a base circle outwardly in the radial direction, and one of the apexes is located at a position opposite to an apex of the nose part with respect to a center line of the shaft part.

According to the above configuration, the shaft part of the cam shaft has the polygonal cross-section configuration having even number of apexes equal to or more than four. Thus, as compared with a case where the shaft part of the cam shaft has a circular cross-section configuration (a circle circumscribing the above-described polygon), it is possible to reduce a volume of the shaft part. Consequently, it is possible to further reduce the weight of the cam shaft.

In addition, the apexes of the shaft part can be disposed at appropriate positions relative to the nose part of the cam part. Thus, it is possible to reduce deformation of the shaft part. Specifically, the shaft part has a certain portion in which the cam part is provided. A part of the certain portion and its surroundings, which part is opposite to the apex of the nose part with respect to the center line of the shaft part, is subjected to a greatest stress. According to the above configuration, one of the apexes of the shaft part is located in the position opposite to the apex of the nose part with respect to the center line of the shaft part. Consequently, a strength of a portion of the shaft part, which portion is subjected to a great stress, is increased relatively as compared with the other portions. Thus, it is possible to reduce deformation of the shaft part.

The above method is preferably arranged such that a shaft part of the cam shaft has a polygonal cross-section configuration having even number of apexes equal to or more than four, and each of the first sand mold and the second sand mold has a parting plane that is a part of a flat plane passing through a center of the shaft part of the cam shaft in the radial direction and two of the apexes.

According to the above method, the shaft part of the cam shaft has the polygonal cross-section configuration having even number of apexes equal to or more than four. Thus, as compared with a case where the shaft part of the cam shaft has a circular cross-section configuration (a circle circumscribing the above-described polygon), it is possible to reduce a volume of the shaft part. Consequently, it is possible to further reduce the weight of the cam shaft.

In addition, each of the first sand mold and the second sand mold has the parting plane that is a part of the flat plane passing through the center of the shaft part of the cam shaft in the radial direction and two of the apexes. Consequently, it is possible to prevent, in manufacturing of the first sand mold and the second sand mold, a case where the pattern is not pulled out of the hardened casting sand. Thus, it is possible to favorably manufacture the cam shaft.

Another aspect of the present invention is a cam shaft for a multiple cylinder engine, including: a shaft part extending in a cylinder bank direction of the engine including a plurality of cylinders; and a plurality of cam parts provided on an outer circumference of the shaft part, wherein the plurality of cam parts are provided at positions that are interposed between both ends of the shaft part and correspond to the respective plurality of cylinders, the shaft part includes a first thickness-reduced part in a first section and a second thickness-reduced part in a second section, the first section being a section between at least one of the ends of the shaft part and one of the plurality of cam parts closest to the at least one of the ends, the second section being a section between one of the plurality of cam parts corresponding to one of two adjacent cylinders and another one of the plurality of cam parts corresponding to another one of the two adjacent cylinders, and the first thickness-reduced part and the second thickness-reduced part are configured such that a strength of the second section of the shaft part is greater than a strength of the first section of the shaft part.

The term "thickness-reduced part" refers to a hole (including a recess and a through hole) or a cutout formed in an outer circumferential surface of a certain portion of a shaft part in a length direction of the shaft part, the shaft part having a constant outer diameter, the hole or the cutout being formed such that a cross-section area of the certain portion is smaller than portions other than the certain portion.

According to the above configuration, it is possible to provide a cam shaft for a multiple cylinder engine, the cam shaft being lightweight and being capable of reducing deformation of a shaft part.

Specifically, according to the above configuration, the shaft part has the first thickness-reduced part and the second thickness-reduced part. Thus, as compared with a configuration not including the first thickness-reduced part and the second thickness-reduced part, the above configuration makes it possible to reduce the weight of the cam shaft by a weight corresponding to volumes of these thickness-reduced parts.

Furthermore, it is possible to effectively reduce deformation of the shaft part for the following reasons. That is, a stress occurring in the shaft part in response to the shaft part receiving a force from the cam part (a stress to twist the shaft part and a stress to bend the shaft part) varies depending on the position of the shaft part in the axial direction (length direction). Specifically, a stress occurring in the second section is greater than a stress occurring in the first section. A reason for this is as follows. That is, a portion of the shaft part closer to the cam part receives a greater force transmitted from the cam. Another reason is as follows. That is, the first section receives the force transmitted only from one side in the axial direction, whereas the second section receives the force transmitted from both sides in the axial direction.

In terms of this, according to the above configuration, the first thickness-reduced part and the second thickness-reduced part are configured such that a strength of the second section of the shaft part is greater than a strength of the first section of the shaft part. This makes it possible to reduce deformation of the second section of the shaft part, even if a greater stress occurs in the second section than in the first section. Consequently, it is possible to effectively reduce occurrence of a disadvantage such as a variation in valve lift degree between the cylinders.

The above cam shaft is preferably configured such that each of the first thickness-reduced part and the second thickness-reduced part is a non-through hole that is opened in an outer circumferential surface of the shaft part, and a depth of the second thickness-reduced part is smaller than a depth of the first thickness-reduced part.

According to the above configuration, each of the first thickness-reduced part and the second thickness-reduced part is a non-through hole that is opened in an outer circumferential surface of the shaft part. Thus, it is possible to easily form these thickness-reduced parts. Furthermore, the depth of the second thickness-reduced part is smaller than the depth of the first thickness-reduced part. Thus, the strength of the second section of the shaft part can be easily and reliably made greater than the strength of the first section of the shaft part.

The above cam shaft is preferably configured such that each of the first thickness-reduced part and the second thickness-reduced part is a non-through hole that is opened in an outer circumferential surface of the shaft part and extends in a length direction of the shaft part, the first thickness-reduced part has a constant depth in a length direction of the first thickness-reduced part, and the second thickness-reduced part has a depth that gradually decreases from a center of the second thickness-reduced part in a length direction of the second thickness-reduced part toward both ends of the second thickness-reduced part in the length direction.

According to the above configuration, each of the first thickness-reduced part and the second thickness-reduced part is a non-through hole that is opened in an outer circumferential surface of the shaft part. Thus, it is possible to easily form these thickness-reduced parts. Furthermore, each of the first thickness-reduced part and the second thickness-reduced part extends in the length direction of the shaft part, the first thickness-reduced part has a constant depth in the length direction of the first thickness-reduced part, and the second thickness-reduced part has a depth that gradually decreases from the center of the second thickness-reduced part in the length direction of the second thickness-reduced part toward both the ends of the second thickness-reduced part in the length direction. Thus, the strength of the second section of the shaft part can be easily made greater than the strength of the first section of the shaft part. Specifically, the first thickness-reduced part has a constant depth in the length direction of the first thickness-reduced part. Thus, the first section has a certain section in which the first thickness-reduced part is formed, and a strength of the certain section of the shaft part can be made substantially constant. Meanwhile, a portion of the second thickness-reduced part, which portion is close to the cam part, has a smaller depth. Thus, a strength of the shaft part at a position (a position close to the cam part) of the second section where a stress is relatively great can be made greater than a strength of the shaft part in another position (a position farther from the cam part) of the second section where a stress is relatively small. Thus, the strength of the second section of the shaft part can be easily made greater than the strength of the first section of the shaft part.

The above cam shaft is preferably configured such that the first thickness-reduced part is a through hole penetrating through the shaft part in a radial direction, and the second thickness-reduced part is a non-through hole that is opened in an outer circumferential surface of the shaft part.

According to the above configuration, the strength of the second section of the shaft part can be easily and reliably made greater than the strength of the first section of the shaft part.

The above cam shaft is preferably configured such that the shaft part has, in a center part of the shaft part in the radial direction, a hollow part extending in a length direction of the shaft part, and each of the first thickness-reduced part and the second thickness-reduced part is communicated with the hollow part.

According to the above configuration, the shaft part has, in the center part of the shaft part in the radial direction, the hollow part extending in the length direction of the shaft part. Thus, as compared with a configuration not including the hollow part, the above configuration makes it possible to further reduce the weight of the cam shaft by a weight corresponding to a volume of the hollow part.

Furthermore, each of the first thickness-reduced part and the second thickness-reduced part is communicated with the hollow part. Thus, in a case where the hollow part is formed with use of a rotary cutting tool, it is possible to quickly discharge a chip occurring during the cutting of a solid shaft part to the outside via the first thickness-reduced part and the second thickness-reduced part. Consequently, it is possible to enhance the efficiency of the cutting.

The above cam shaft is preferably configured such that the shaft part has, in a center part of the shaft part in the radial direction, a hollow part extending in a length direction of the shaft part, and among the first thickness-reduced part and the second thickness-reduced part, only the first thickness-reduced part is communicated with the hollow part.

According to the above configuration, the shaft part has, in the center part of the shaft part in the radial direction, the hollow part extending in the length direction of the shaft part. Thus, as compared with a configuration not including the hollow part, the above configuration makes it possible to further reduce the weight of the cam shaft by a weight corresponding to a volume of the hollow part.

Furthermore, the first thickness-reduced part is communicated with the hollow part. Thus, in a case where the hollow part is formed with use of a rotary cutting tool, it is possible to quickly discharge chips occurring during the cutting of a solid shaft part to the outside via the first thickness-reduced part. Consequently, it is possible to enhance the efficiency of the cutting. Furthermore, among the first thickness-reduced part and the second thickness-reduced part, only the first thickness-reduced part is communicated with the hollow part. Thus, in the second section, it is possible to suppress reduction in a strength of the shaft part, which reduction may be caused by the configuration in which the second thickness-reduced part is communicated with the hollow part. Consequently, it is possible to more effectively reduce deformation of the second section of the shaft part.

A method according to the present invention for manufacturing the cam shaft for the multiple cylinder engine includes the steps of; casting a solid cam shaft including a solid shaft part having a center part in a radial direction, the center part being solid, the solid shaft part having an outer circumference provided with the plurality of cam parts; and forming a hollow part by cutting the center part of the solid shaft part in the radial direction with use of a rotary cutting tool.

According to the above method, the hollow part is formed by cutting the center part of the solid shaft part in the radial direction with use of the rotary cutting tool. Therefore, it is not necessary to use a core in the step of casting in order to form the hollow part. Thus, it is possible to easily form the hollow part at relatively low cost.

The above method is preferably arranged such that, among the first thickness-reduced part and the second thickness-reduced part casted in the step of casting, a thickness-reduced part that is made communicated with the hollow part in the step of forming the hollow part has a size allowing a chip occurring during the cutting by the rotary cutting tool to be discharged to an outside.

According to the above method, the thickness-reduced part that is made communicated with the hollow part in the step of forming the hollow part has a size allowing a chip occurring during the cutting by the rotary cutting tool to be discharged to the outside. Consequently, it is possible to quickly discharge a chip occurring during the cutting to the outside via the thickness-reduced part. Consequently, it is possible to effectively enhance the efficiency of the cutting.

The invention claimed is:

1. A cam shaft for an engine, the cam shaft being made by casting, the cam shaft comprising:
   a shaft part; and
   a cam part disposed on an outer circumference of the shaft part, wherein the shaft part has a hole that is opened at a predetermined position in an outer circumferential surface of the shaft part,
   the hole is gradually tapered from an outside of the shaft part toward a center of the shaft part in a radial direction,
   the hole includes a first hole that is opened on one side of the shaft part in the radial direction and a second hole that is opened on another side of the shaft part in the radial direction, and
   each of the first hole and the second hole is gradually tapered from the outside of the shaft part toward the center of the shaft part in the radial direction.

2. The cam shaft for an engine according to claim 1, wherein the first hole is formed at a position at which the first hole is symmetric to the second hole with respect to a center line of the shaft part, and has a same shape as a shape of the second hole.

3. A cam shaft for an engine, the cam shaft being made by casting, the cam shaft comprising:
   a shaft part; and
   a cam part disposed on an outer circumference of the shaft part, wherein
   the shaft part has a hole that is opened at a predetermined position in an outer circumferential surface of the shaft part,
   the hole is gradually tapered from an outside of the shaft part toward a center of the shaft part in a radial direction,
   the cam part has a nose part protruding from a base circle outwardly in the radial direction,
   the hole includes a third hole extending in the radial direction from a portion of the shaft part, which portion is close to the nose part, and a fourth hole extending in the radial direction from a portion of the shaft part, which portion is opposite to the nose part in the radial direction, and
   the fourth hole has a smaller depth than a depth of the third hole.

* * * * *